United States Patent
Imai et al.

(10) Patent No.: US 7,544,461 B2
(45) Date of Patent: Jun. 9, 2009

(54) NEAR INFRARED RAY ACTIVATION TYPE POSITIVE RESIN COMPOSITION

(75) Inventors: Genji Imai, Hiratsuka (JP); Toshikazu Murayama, Yokkaichi (JP); Katsuhiro Ito, Yokkaichi (JP); Haruhumi Hagino, Yokkaichi (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 11/632,834

(22) PCT Filed: Jul. 22, 2005

(86) PCT No.: PCT/JP2005/013508

§ 371 (c)(1),
(2), (4) Date: Jan. 19, 2007

(87) PCT Pub. No.: WO2006/009258

PCT Pub. Date: Jan. 26, 2006

(65) Prior Publication Data

US 2007/0259279 A1    Nov. 8, 2007

(30) Foreign Application Priority Data

Jul. 22, 2004  (JP) ............... 2004-214901
Jul. 22, 2004  (JP) ............... 2004-214903

(51) Int. Cl.
*G03F 7/00*    (2006.01)
*G03F 7/004*   (2006.01)

(52) U.S. Cl. ............... 430/270.1; 430/281.1; 430/302; 430/303; 430/905; 430/270.15; 430/945

(58) Field of Classification Search ............ 430/270.1, 430/281.1, 905, 302, 303, 945
See application file for complete search history.

(56) References Cited

U.S. PATENT DOCUMENTS

| 4,708,925 | A | 11/1987 | Newman |
| 6,117,613 | A | 9/2000 | Kawauchi et al. |
| 6,716,565 | B2 * | 4/2004 | Kunita et al. ............ 430/270.1 |
| 7,015,363 | B2 * | 3/2006 | Shimizu et al. ............ 568/591 |
| 2004/0023153 | A1 * | 2/2004 | Takeda et al. ............ 430/270.1 |
| 2004/0038149 | A1 | 2/2004 | Murakami et al. |
| 2004/0181097 | A1 | 9/2004 | Shimizu et al. |

FOREIGN PATENT DOCUMENTS

| JP | 60-175046 A | 9/1985 |
| JP | 10-090881 A | 4/1998 |
| JP | 10-161304 A | 6/1998 |
| JP | 10-198036 A | 7/1998 |
| JP | 10-282670 A | 10/1998 |
| JP | 11-231515 A | 8/1999 |
| JP | 2000-35666 A | 2/2000 |
| JP | 2001-166460 A | 6/2001 |
| JP | 2004-45448 A | 2/2004 |
| WO | WO01/71428 | 9/2001 |
| WO | WO 03/006407 A1 | 1/2003 |

* cited by examiner

*Primary Examiner*—Amanda C. Walke
(74) *Attorney, Agent, or Firm*—Fitch, Even, Tabin & Flannery

(57) ABSTRACT

A near infrared ray activation type positive resist composition comprising
(A) a vinyl-based polymer having a monomer unit having an alkali-soluble group blocked by an ether having an alkenyl group next to an ether oxygen,
(B) a photothermal converting substance generating heat by a light in the near infrared region,
(C) a thermal acid generator generating an acid by heat,
can provide a near infrared ray activation type positive resist composition which can be subjected to an exposure treatment in a complete bright room such as under a white light and the like, gives desired sensitivity and resolution, and of which baking treatment conditions can be relaxed or a baking treatment can be omitted, and a pattern formation method using the same.

7 Claims, No Drawings

NEAR INFRARED RAY ACTIVATION TYPE POSITIVE RESIN COMPOSITION

This Application is the National Phase of International Application No. PCT/JP2005/013508 filed Jul. 22, 2005, which designated the U.S. and was not published under PCI Article 21(2) in English, and this application claims, via the aforesaid International Application, the foreign priority benefit of and claims the priority from Japanese Application No. 2004-214901, filed Jul. 22, 2004, and from Japanese Application No. 2004-214903, filed Jul. 22, 2004 the complete disclosures of said PCT and priority applications are incorporated herein by reference.

TECHNOLOGICAL FIELD

The present invention relates to a positive resin composition which can form a pattern by near infrared ray.

BACKGROUND ART

Image information digitalization has brought the major break to the field graphic art, and CTP (Computer to Plate) which outputs image information to be imparted to a printing plate as digital information directly to a printing plate from a computer to produce a plate is extremely effective in increasing the quality of printing and in decreasing cost and, is significantly paid to attention. For example, a positive resist layer on a base plate is exposed according to the information (image information) of a pattern input to an exposing apparatus as digital information from a computer, and a given development treatment is effected to form a pattern composed directly of a resist, thus, the whole plate or a part thereof can be formed. The application range of CTP is wide, and applications to direct production of various plates such as flat plates, concave plates, convex plates, gravure plates and the like are being examined.

On the other hand, as lights for exposure of various resist materials, there are utilized ultraviolet ray, far ultraviolet ray, electron beam, X ray, laser light, gamma ray and the like. The lights have respective characteristics, and use of semiconductor lasers of which apparatus can be miniaturized easily has been investigated. Among others, a near infrared semiconductor laser ($\lambda$=830 nm) has merits that output is high and additionally, its apparatus can be miniaturized, and a bright room exposure operation under natural light or interior illumination is possible, thus, is useful as a light for exposure of a resist in the case of CTP as described above and the like.

Positive photosensitive compositions responding to laser lights in the near infrared wavelength region are described in Japanese Patent Application Laid-Open (JP-A) Nos. 10-90881, 10-161304, 11-231515 and 2001-166460.

DISCLOSURE OF THE INVENTION

The present invention has an object of providing a near infrared ray activation type positive resist composition which can be subjected to an exposure treatment in a complete bright room such as under a white light and the like, gives desired sensitivity and resolution, and of which baking treatment conditions can be relaxed or a baking treatment can be omitted, and a pattern formation method using the same.

The near infrared ray activation type positive resist composition of the present invention is characterized in that it contains (A) a vinyl-based polymer having a monomer unit having an alkali-soluble group blocked by an ether having an alkenyl group next to an ether oxygen, (B) a photothermal converting substance generating heat by a light in the near infrared region, (C) a thermal acid generator generating an acid by heat.

The method for forming a pattern of the present invention is characterized in that it has the steps of forming a layer of the above-mentioned near infrared ray activation type positive resist composition on a base plate, irradiating a given part of the layer with near infrared ray, and removing the irradiated part from on the above-mentioned base plate by alkali development to form a pattern of the above-mentioned near infrared ray activation type positive resist composition on the above-mentioned base plate.

The present invention can provide a near infrared ray activation type positive resist composition which can be subjected to an exposure treatment in a complete bright room such as under a white light and the like, gives desired sensitivity and resolution and of which baking treatment conditions can be relaxed or a baking treatment can be omitted, and a pattern formation method using the same.

BEST MODES FOR CARRYING OUT THE INVENTION

The near infrared ray activation type positive resist composition of the present invention contains at least the following components (A) to (C):

(A) a vinyl-based polymer having a monomer unit having an alkali-soluble group blocked by an ether having an alkenyl group next to an ether oxygen, (B) a photothermal converting substance generating heat by a light in the near infrared region, (C) a thermal acid generator generating an acid by heat.

The above-mentioned component (A) is a vinyl-based polymer obtained by using as a monomer at least a compound having a polymerizable ethylenically unsaturated bond. In this vinyl-based polymer, a unit obtained from a monomer having an ethylenically unsaturated bond has further a group in which an alkali-soluble group is blocked using an ether having an alkenyl group next to an oxygen atom and which is releasable by an acid (hereinafter, referred to as alkenyl ether for blocking).

The compound having an ethylenically unsaturated bond and an alkali-soluble group is not particularly restricted providing it can constitute a structural unit in which its alkali-soluble group can be blocked by the alkenyl ether for blocking and further, this block is dissociated by the action of an acid and its part becomes alkali-soluble. As such an alkali-soluble group, alkali-soluble groups having a pKa of 11 or less such as a phenolic hydroxyl group, carboxyl group, sulfo group, imide group, sulfoneamide group, N-sulfoneamide group, N-sutoneurethane group, active methylene group and the like are mentioned.

As the alkenyl ether for blocking, (I) ethers having an alkenyl group next to an ether oxygen (excluding alkyl vinyl ethers; hereinafter, referred to as ether (I) for blocking), and (II) alkyl vinyl ethers (hereinafter, referred to as ether (II) for blocking), are mentioned as preferable examples.

Therefore, as the blocked monomer unit when a vinyl-based polymer as the component (A) has a carboxyl group as the alkali-soluble group, (A-1) monomer units having a carboxyl group blocked by the ether (I) for blocking, and (A-2) monomer units having a carboxyl group blocked by the ether (II) for blocking, are mentioned. As the monomer unit (A-1), preferably mentioned are structural units of the following formula (1a), and as the monomer unit (A-2), preferably mentioned are structural units of the following formula (1b).

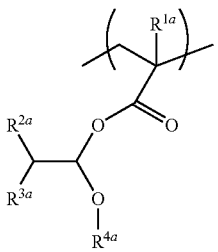

(1a)

[wherein, $R^{1a}$ represents a hydrogen atom or a lower alkyl group, $R^{2a}$, $R^{3a}$ are the same or different and represent a hydrogen atom, substituted or unsubstituted alkyl group, substituted or unsubstituted aryl group or substituted or unsubstituted aralkyl group (wherein, $R^{2a}$ and $R^{3a}$ do not represent a hydrogen atom at the same time), alternatively, $R^{2a}$ and $R^{3a}$ may form a cycloalkyl group together with an adjacent carbon atom. $R^{4a}$ represents a substituted or unsubstituted alkyl group, substituted or unsubstituted aryl group or substituted or unsubstituted aralkyl group.].

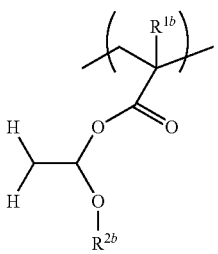

(1b)

(wherein, $R^{1b}$ represents a hydrogen atom or a lower alkyl group, $R^{2b}$ represents a substituted or unsubstituted alkyl group.).

As the lower alkyl group represented by $R^{1a}$ in the above-mentioned general formula (1a), for example, linear or branched alkyl groups having 1 to 8 carbon atoms are mentioned, and specific examples thereof include a methyl group, ethyl group, propyl group, isopropyl group, butyl group, isobutyl group, sec-butyl group, tert-butyl group, pentyl group, hexyl group, heptyl group, octyl group and the like.

As the alkyl group represented by $R^{2a}$ to $R^{4a}$, for example, linear or branched alkyl groups having 1 to 18 carbon atoms are mentioned, and specific examples thereof include a methyl group, ethyl group, propyl group, isopropyl group, butyl group, isobutyl group, sec-butyl group, tert-butyl group, pentyl group, hexyl group, heptyl group, octyl group, nonyl group, decyl group, dodecyl group, octadecyl group and the like, and among others, alkyl groups having 1 to 6 carbon atoms are preferable, further, alkyl groups having 1 to 3 carbon atoms are more preferable.

As the cycloalkyl group formed by $R^{2a}$ and $R^{3a}$ together with an adjacent carbon atom, for example, cycloalkyl groups having 3 to 8 carbon atoms are mentioned, and specific examples thereof include a cyclopropyl group, cyclobutyl group, cyclopentyl group, cyclohexyl group, cycloheptyl group, cyclooctyl group and the like.

As the aryl group represented by $R^{2a}$ to $R^{4a}$, for example, aryl groups having 6 to 12 carbon atoms are mentioned, and specific examples thereof include a phenyl group, naphthyl group and the like.

As the aralkyl group represented by $R^{2a}$ to $R^{4a}$, for example, those having 7 to 15 carbon atoms are mentioned, and specific examples thereof include a benzyl group, phenethyl group, naphthylmethyl group, naphthylethyl group and the like.

As the substituent on the substituted alkyl represented by $R^{2a}$ to $R^{4a}$, for example, lower alkoxyl groups, lower alkanoyl groups, cyano group, nitro group, halogen atoms, lower alkoxycarbonyl groups and the like are mentioned.

As the substituent on the substituted aryl group and the substituted aralkyl group represented by $R^{2a}$ to $R^{4a}$, for example, lower alkyl groups, lower alkoxyl groups, lower alkanoyl groups, cyano group, nitro group, halogen atoms, lower alkoxycarbonyl groups and the like are mentioned.

Structural units are preferable in which one of $R^{2a}$ and $R^{3a}$ is a hydrogen atom and another is an alkyl group, or both of them are alkyl groups, further, $R^{4a}$ is an alkyl group, in the general formula (1a), are preferable.

As the lower alkyl group represented by $R^{1b}$ in the above-mentioned general formula (1b), for example, linear or branched alkyl groups having 1 to 8 carbon atoms are mentioned, and specific examples thereof include a methyl group, ethyl group, propyl group, isopropyl group, butyl group, isobutyl group, sec-butyl group, tert-butyl group, pentyl group, hexyl group, heptyl group, octyl group and the like.

As the alkyl group represented by $R^{2b}$, for example, linear or branched alkyl groups having 1 to 18 carbon atoms are mentioned, and specific examples thereof include a methyl group, ethyl group, propyl group, isopropyl group, butyl group, isobutyl group, sec-butyl group, tert-butyl group, pentyl group, hexyl group, heptyl group, octyl group, nonyl group, decyl group, dodecyl group, octadecyl group and the like, and among others, alkyl groups having 1 to 6 carbon atoms are preferable, further, alkyl groups having 1 to 3 carbon atoms are more preferable.

As the substituent on the substituted alkyl represented by $R^{2b}$, for example, lower alkoxyl groups, lower alkanoyl groups, cyano group, nitro group, halogen atoms, lower alkoxycarbonyl groups and the like are mentioned.

In the definition of the above-mentioned substituents, mentioned as the lower alkyl group moiety of lower alkyl groups, lower alkoxyl groups, lower alkanoyl groups and lower alkoxycarbonyl groups are the same moieties as exemplified for the lower alkyl group represented by $R^{1a}$ and $R^{1b}$. Therefore, as the lower alkanoyl group, for example, linear or branched groups having 2 to 9 carbon atoms are mentioned, and specific examples thereof include an acetyl group, propionyl group, butyryl group, isobutyryl group, valery group, isovaleryl group, pivaloyl group, hexanoyl group, heptanoyl group and the like. As the halogen atom, atoms of fluorine, chlorine, bromine and iodine are mentioned.

As to the monomer for forming a structural unit represented by the above-mentioned general formula (1a):

(meth)acrylic acid of the following formula (2a) or its derivative

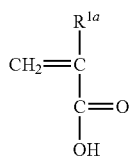

(2a)

[wherein, $R^{1a}$ is as defined for the general formula (1a)]

is reacted with a corresponding ether (I) for blocking, and a carboxyl group of the compound of the general formula (2a)

is blocked, thus, a monomer having a structure of the following formula (3a) can be obtained.

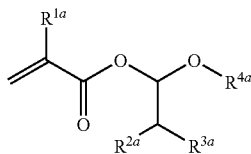

(3a)

[wherein, $R^{1a}$, $R^{2a}$, $R^{3a}$ and $R^{4a}$ are as defined for the general formula (1a).].

The ether (I) for blocking to be used for the above-mentioned monomer formation reaction may advantageously be that which can block a carboxyl group of a compound having an ethylenically unsaturated bond and an alkali-soluble group such as a carboxyl group and the like constituting units of the monomer, and for example, those having a structure of the following general formula (4a) are preferable.

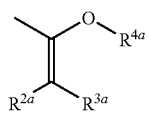

(4a)

[wherein, $R^{2a}$, $R^{3a}$, $R^{4a}$ are as defined for the general formula (1a).].

Specific examples of the ether (I) for blocking include 1-methoxy-2-methylpropene, 1-ethoxy-2-methylpropene, 1-propoxy-2-methylpropene, 1-isopropoxy-2-methylpropene, 1-butoxy-2-methylpropene, 1-isobutoxy-2-methylpropene, 1-(tert-butoxy)-2-methylpropene, 1-pentyloxy-2-methylpropene, 1-isopentyloxy-2-methylpropene, 1-neopentyloxy-2-methylpropene, 1-(tert-pentyloxy)-2-methylpropene, 1-pentyloxy-2-methylpropene, 1-isohexyloxy-2-methylpropene, 1-(2-ethylhexyloxy)-2-methylpropene, 1-heptyloxy-2-methylpropene, 1-octyloxy-2-methylpropene, 1-nonyloxy-2-methylpropene, 1-decanyloxy-2-methylpropene, 1-dodecanyloxy-2-methylpropene, 1-octadecanyloxy-2-methylpropene, 1-methoxy-2-methyl-1-butene, 1-ethoxy-2-methyl-1-butene, 1-propoxy-2-methyl-1-butene, 1-isopropoxy-2-methyl-1-butene, 1-butoxy-2-methyl-1-butene, 1-isobutoxy-2-methyl-1-butene, 1-(tert-butoxy)-2-methyl-1-butene, 1-pentyloxy-2-methyl-1-butene, 1-isopentyloxy-2-methyl-1-butene, 1-neopentyloxy-2-methyl-1-butene, 1-(tert-pentyloxy)-2-methyl-1-butene, 1-hexyloxy-2-methyl-1-butene, 1-isohexyloxy-2-methyl-1-butene, 1-(2-ethylhexyloxy)-2-methyl-1-butene, 1-heptyloxy-2-methyl-1-butene, 1-octyloxy-2-methyl-1-butene, 1-nonyloxy-2-methyl-1-butene, 1-decanyloxy-2-methyl-1-butene, 1-dodecanyloxy-2-methyl-1-butene, 1-octadecanyloxy-2-ethyl-1-butene, 1-(2-methoxyethoxy)-2-methylpropene, 1-(2-ethoxyethoxy)-2-methylpropene, 1-(2-butoxyethoxy)-2-methylpropene, 1-(2-methoxyethoxy)-2-methyl-1-butene, 1-(2-ethoxyethoxy)-2-methyl-1-butene, 1-(2-butoxyethoxy)-2-methyl-1-butene, 1-(2-methoxyethoxy)-2-ethyl-1-butene, 1-(2-ethoxyethoxy)-2-ethyl-1-butene, 1-(2-butoxyethoxy)-2-ethyl-1-butene, and the like.

As to the monomer for forming a structural unit represented by the above-mentioned general formula (1b):
(meth)acrylic acid of the following formula (2b) or its derivative

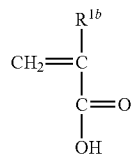

(2b)

[wherein, $R^{1b}$ is as defined for the general formula (1b)]

is reacted with a corresponding ether (II) for blocking, and a carboxyl group of the compound of the general formula (2b) is blocked, thus, a monomer having a structure of the following formula (3b) can be obtained.

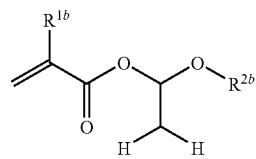

(3b)

[wherein, $R^{1b}$ and $R^{2b}$ are as defined for the general formula (1b).].

The ether (II) for blocking to be used for the above-mentioned monomer formation may advantageously be that which can block a carboxyl group of a compound having an ethylenically unsaturated bond and an alkali-soluble group such as a carboxyl group and the like constituting units of the monomer, and for example, those having a structure of the following general formula (4b) are preferable.

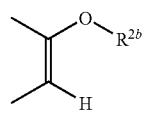

(4b)

[wherein, $R^{2b}$ is as defined for the general formula (1b).].

The vinyl-based polymer having a structural unit blocked by an alkenyl ether for blocking to be used as the component (A) of a composition according to the present invention can be obtained by performing a polymerization reaction under the condition wherein an alkali-soluble group of the compound having a polymerizable ethylenically unsaturated bond and an alkali-soluble group as described above is blocked by the alkenyl ether for blocking. Blocking using the alkenyl ether for blocking of a carboxyl group and the like as the alkali-soluble group can be conducted according to known methods such as a method described in International Publication WO 2003/6407 and the like.

Further, the vinyl-based polymer as the component (A) can have a constitution as a copolymer having two or more structural units, and may also be that containing a structural unit obtained from other monomer than the compound having a polymerizable ethylenically unsaturated bond and an alkali-soluble group, in a range not deteriorating the effect of the present invention. It is not required that all alkali-soluble groups in a vinyl-based polymer are blocked, and it may be sufficient that alkali-soluble groups in preferably 50 mol % or more, more preferably 70 mol % or more of monomer units having alkali-soluble groups are blocked. When the proportion of blocked alkali-soluble groups is higher, the storage stability of a polymer itself and a resist composition containing is further improved. By inclusion of a monomer unit in which an alkali-soluble group is blocked using an alkenyl ether for blocking, in a polymer, pre-baking conditions in forming a photosensitive layer made of a resin composition before exposure using this polymer can be relaxed, or the pre-baking can be omitted. That is, even in forming a photosensitive layer at room temperature, excellent shape stability can be imparted to a photosensitive layer. This shape stability can be obtained likewise also in producing a plate of large area, and a large scale heating apparatus for effecting a pre-baking treatment and a cooling apparatus after the pre-baking treatment are unnecessary, and warping of a base plate when using a metal and the like as a base plate of a plate and a influence on the quality (preciseness of plate) of a plate based on change in dimension of a base plate due to thermal expansion and constriction in cooling can be excluded.

When a desired property is added by introducing a monomer unit not blocked in the above-mentioned copolymer, it is preferable that the proportion of monomer units having a block using an alkenyl ether for blocking is 50 to 70% of the sum of monomer units blocked by an alkenyl ether for blocking and monomer units not blocked.

As the form of the above-mentioned copolymer, various forms of a random copolymer, block copolymer and the like can be used.

When a monomer represented by the general formula (3a) or (3b) mentioned above is used, the content of the monomer represented by the general formula (3a) or (3b) is preferably 2 to 60 wt %, more preferably 5 to 40 wt % in raw materials of a vinyl-based polymer as the component (A). When the content of the monomer represented by the general formula (3a) or (3b) is 2 wt % or more, developability of the resulting photosensitive composition is more excellent, and when 60 wt % or less, mechanical property of a film (coated film) resulting from the composition is more excellent.

As other monomers which can be used in addition to a compound having an ethylenically unsaturated bond and in which an alkali-soluble group is blocked, as the monomer for forming a vinyl-based polymer, mentioned are compounds having a polymerizable ethylenically unsaturated bond. In the case of such a copolymer, the proportion of monomer units carrying a blocked alkali-soluble group in monomers units of the whole copolymer can be preferably 5% or more, more preferably 10% or more.

The compound having a polymerizable ethylenically unsaturated bond is not particularly restricted and examples thereof include vinyl acetate; (meth)acrylic acid; alkyl (meth)acrylates composed of alcohols having 1 to 8 carbon atoms and (meth)acrylic acid such as methyl (meth)acrylate, ethyl (meth)acrylate, butyl (meth)acrylate, isobutyl (meth)acrylate, tert-butyl (meth)acrylate, cyclohexyl (meth)acrylate, 2-ethylhexyl (meth)acrylate, lauryl (meth)acrylate, stearyl (meth)acrylate and the like; aromatic vinyl compounds such as styrene, a-methylstyrene, p-methylstyrene, dimethylstyrene, divinylbenzene and the like; Hydroxylalkyl (meth)acrylates such as 2-hydroxyethyl (meth)acrylate, 2-hydroxypropyl (meth)acrylate and the like; glycol di(meth)acrylates such as ethylene glycol di(meth)acrylate, butane diol di(meth)acrylate and the like; alkyl amino alkyl (meth)acrylates such as dimethyl amino ethyl (meth)acrylate and the like; fluorine-containing vinyl monomers such as trifluoroethyl (meth)acrylate, pentafluoropropyl (meth)acrylate, perfluorocyclohexyl (meth)acrylate, 2,2,3,3-tetrafluoropropyl (meth)acrylate, β-(perfluorooctyl) ethyl(meth)acrylate and the like; siloxane-containing vinyl monomers such as 1-[3-(meth)acryloxypropyl]-1,1,3,3,3-pentamethyldisiloxane, 3-(meth)acryloxypropyl tris(trimethylsiloxane)-silane, AK-5 [silicone macro monomer, manufactured by Toagosei Co., Ltd.] and the like; hydrolysable silyl group-containing vinyl monomers such as vinyltrimethoxysilane, vinylmethyldiimethoxysilane, 3-(meth)acryloxypropyltrimethoxysilane, 3-(meth)acryloxypropylmethyldimethoxysilane, 3-(meth)acryloxypropyltriethoxysilane, 3-(meth)acryloxypropyldiethoxysilane and the like; vinyl ethers such as vinyl methyl ether, vinyl ethyl ether, vinyl isobutyl ether and the like: poly-basic unsaturated carboxylic acids such as fumaric acid, maleic acid, maleic anhydride, linseed oil fatty acid, tail oil fatty acid, dehydrated castor oil fatty acid and the like or esters thereof with mono-hydric or poly-hydric alcohols; known vinyl-based monomers such as dimethylamino ethyl (meth)acrylate methyl chloride salt, isobornyl (meth)acrylate, allyl alcohol, allyl alcohol ester, vinyl chloride, vinylidene chloride, trimethylolpropane tri(meth)acrylate, vinyl propionate, (meth)acrylonitrile, macro monomers AS-6, AN-6, AA-6, AB-6 [manufactured by Toagosei Co., Ltd.] and the like. These compounds can be selected singly or in combination and used.

In the present invention, "(meth)acrylic acid" means acrylic acid or methacrylic acid, and also other (meth)acrylic acid derivatives have the same meaning.

By polymerizing at least one monomer having a polymerizable unsaturated double bond and in which an alkali-soluble group is blocked and at least one monomer to be added if necessary, a vinyl-based polymer which can be used as the component (A) can be obtained. Polymerization can be carried out according to a known method.

For polymerization, a reaction solvent may be used, and the reaction solvent is not particularly restricted providing it is inactive to the reaction, and examples thereof include benzene, toluene, xylene, hexane, cyclohexane, ethyl acetate, butyl acetate, methyl lactate, ethyl lactate, dioxane, dioxolane, γ-butyrolactone, 3-methyl-3-methoxybutyl acetate, acetone, methyl ethyl ketone, methyl isobutyl ketone, diisobutyl ketone, cyclohexanone, anisole, methanol, ethanol, propanol, 2-propanol, butanol, N-methylpyrrolidone, tetrahydrofuran, acetonitrile, ethylene glycol monobutyl ether, ethylene glycol monobutyl ether acetate, diethylene glycol monobutyl ether, diethylene glycol monobutyl ether acetate, propylene glycol monomethyl ether, dipropylene glycol monomethyl ether, propylene glycol monoethyl ether, propylene glycol monomethyl ether acetate, dipropylene glycol monomethyl ether acetate, methoxybutanol, methoxy butyl acetate, 3-methyl-3-methoxy-1-butanol, water, dimethyl sulfoxide, dimethyl formamide, dimethyl acetamide and the like.

The polymerization initiator varies depending on the polymerization mode, and examples thereof include, in the case of radical polymerization, 2,2'-azobisisobutyronitrile (AIBN), 2,2'-azobis-2-methylbutyronitrile (AMBN), 2,2'-azobisvaleronitrile, benzoyl peroxide, acetyl peroxide, lauroyl peroxide, 1,1-bis(tert-butyl peroxy)-3,3,5-trimethylcyclohexane, tert-butyl peroxy-2-ethyl hexanoate, cumene hydroperoxide, tert-butyl peroxy benzoate, tert-butyl peroxide, methyl ethyl ketone peroxide, m-chloroperbenzoic acid, potassium persulfate, sodium persulfate, ammonium persulfate and the like, and the use amount thereof is preferably 0.01 to 20 wt % based on all raw materials.

Examples of the chain transfer agent include thio-β-naphthol, thiophenol, n-butyl mercaptan, ethyl thioglycolate, mercaptoethanol, isopropyl mercaptan, tert-butyl mercaptan, diphenyl disulfide, diethyl dithioglycolate, diethyl disulfide and the like, and the use amount thereof is preferably 0.01 to 5 wt % based on all raw materials.

The weight-average molecular weight of the above-mentioned vinyl-based polymer is preferably 2000 to 300000, more preferably 3000 to 200000, further preferably 5000 to 100000.

The monomer composition of a vinyl-based polymer as the component (A) is selected so that the composition itself, or in combination with components (B) and (C) described later, gives a property as a desired positive resist, and it is preferable that the composition is so set that, for example, an exposure treatment in a complete bright room such as under a white light and the like is possible, desired sensitivity and resolution are obtained at the strength of laser lights in the near infrared region used for exposure, further, a baking treatment is unnecessary in forming a coated film and a layer.

For preparing a vinyl-based polymer as the component (A), a method for preparation by a polymerization reaction using at least a monomer in which an alkali-soluble group is previously blocked by an alkenyl ether for blocking and having a polymerizable ethylenic double bond is used, and additionally, a method can also be used in which a vinyl-based polymer having an alkali-soluble group is prepared previously and this alkali-soluble group is blocked by an alkenyl ether for blocking.

The content of a vinyl-based polymer as the component (A) in a positive resist composition of the present invention can be preferably 60 to 95 wt %, more preferably 70 to 85 wt % based on the total amount of the components (A), (B) and (C).

The photothermal converting substance generating heat by a light in the near infrared region to be contained in a positive resist composition of the present invention (hereinafter, referred to simply as photothermal converting substance in some cases) is a photothermal converting substance generating heat by a light in the near infrared region, and is not particularly restricted providing, for example, it does not deteriorate an application for forming a printing plate and the like by being compounded into the positive resist composition. As such a photothermal converting substance, there are mentioned various organic or inorganic dyes and pigments, organic dyes, metals, metal oxides, metal carbides, metal borides and the like. Of them, light-absorbing dyes are useful. In particular, preferable are light-absorbing dyes absorbing efficiently lights in a wavelength range of 700 to 2000 nm, preferably 800 to 1600 nm, in a positive resist composition of the present invention. As these photothermal converting substances, preferable are substances which efficiently absorb lights in a near infrared region and dot not absorb lights in the ultraviolet region and the visible region situated at shorter wavelength side than the above-mentioned wavelength range, or, even if absorb, are not substantially sensitive, for enabling an exposure treatment even in a bright room such as under a white light and the like.

Specific examples thereof include various pigments such as carbon black and the like; cyanine dye, phthalocyanine dye, polymethine dye, squarilium dye, cloconium dye, pyrylium dye, thiopyrylium dye and the like. Of them, the cyanine dye and phthlocyanine dye are preferably mentioned. These compounds can be used singly or, if necessary, in combination of two or more. Specific examples thereof will be listed below. A wavelength and a solvent name appended to a chemical formula represent the absorption maximum wavelength (λ max) and a solvent in measuring the wavelength by an ordinary method, respectively.

Specific examples of the cyanine dye are listed below.

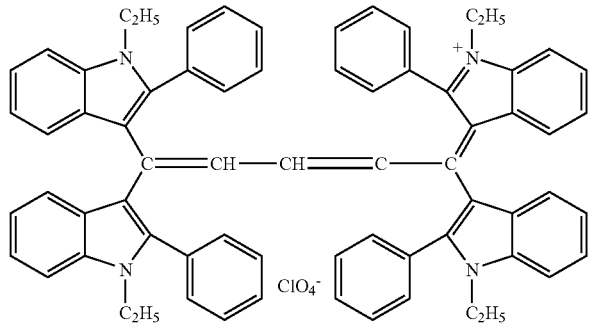

725 nm(MeOH)

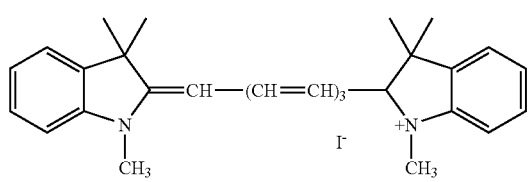

741 nm(MeOH)

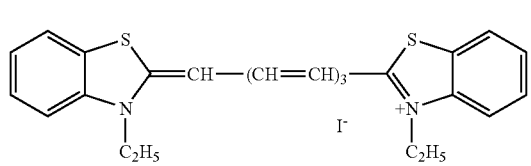

759 nm(MeOH)

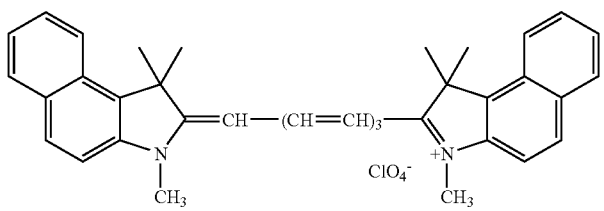

778 nm(MeOH)

-continued
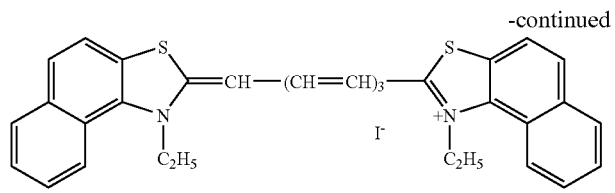
795 nm(MeOH—CHCl₃)
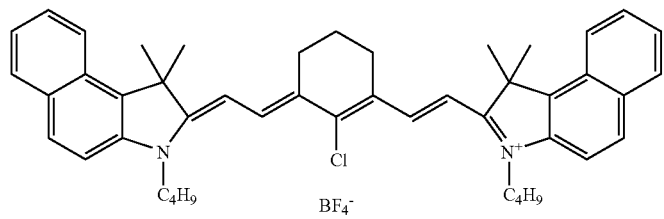
812 nm(MeOH)
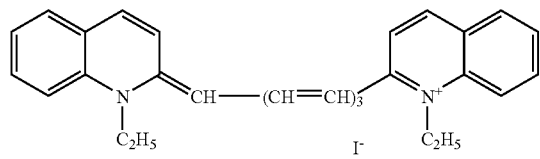
817 nm(MeOH)
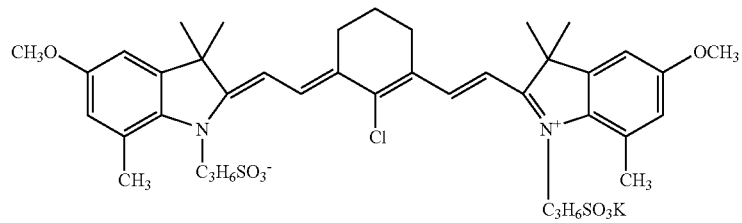
815 nm(MeOH)
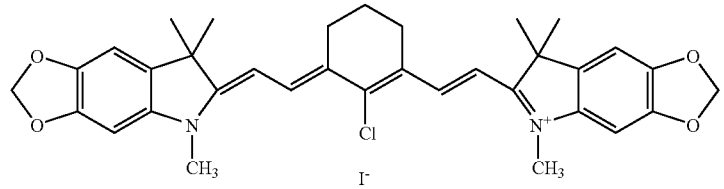
830 nm(DAA)
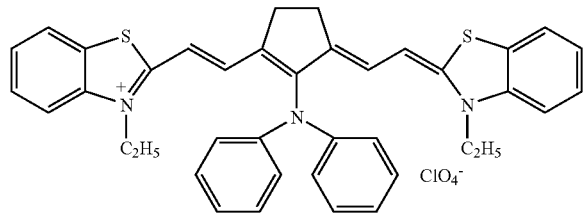
831 nm(DMSO)

-continued
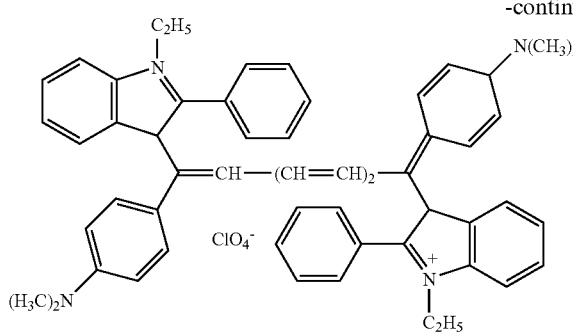
897 nm(MeOH)
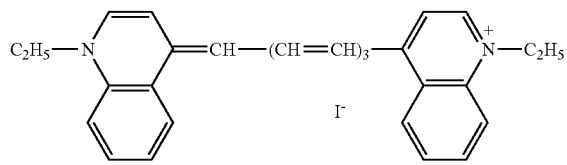
928 nm(MeOH)
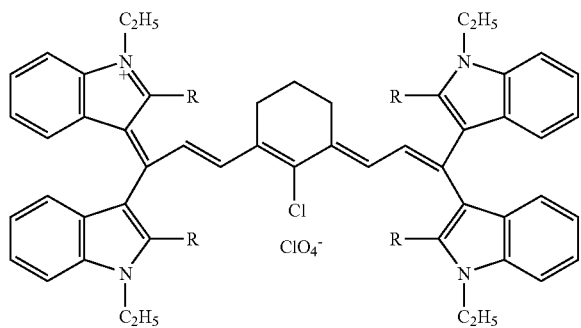
R = C$_2$H$_5$; 979 nm(DAA)
R = Phenyl; 1007 nm(DAA)
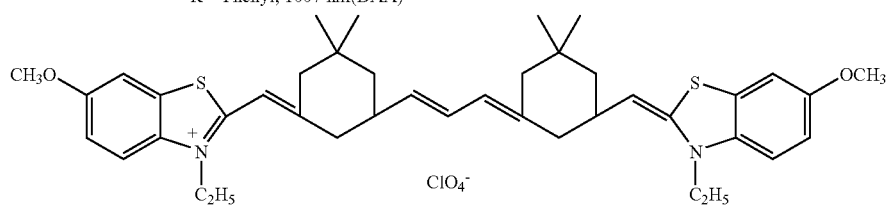
1054 nm(1, 2-DCE)

-continued
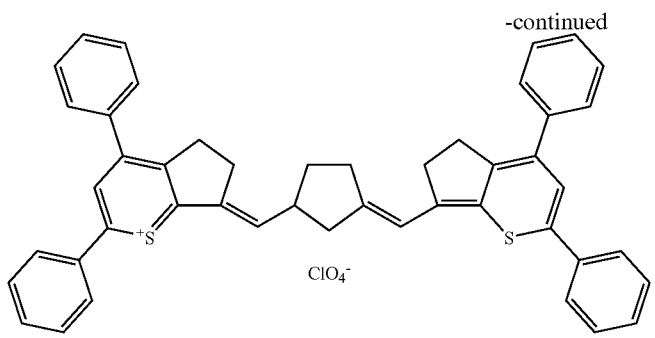
1270 nm(1, 2-DCE)
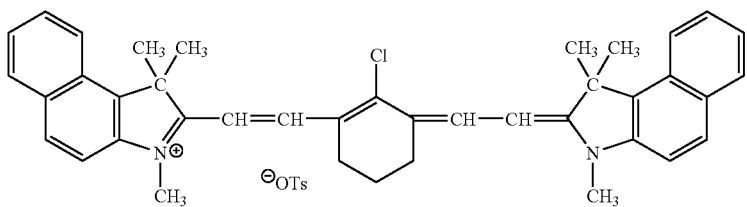
813 nm
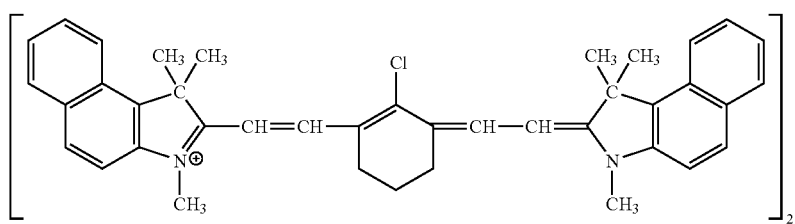 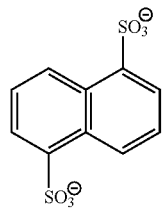
813 nm
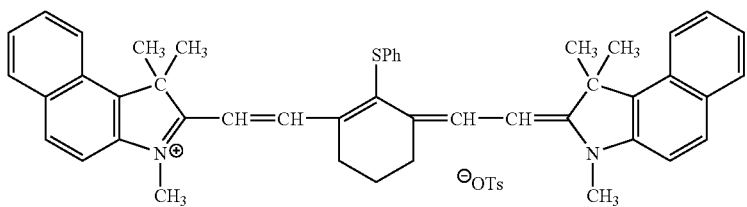
826 nm (Wavelengths of the above-described three dyes are all measured in MeOH.)
Specific examples of the phthalocyanine dye are listed below.
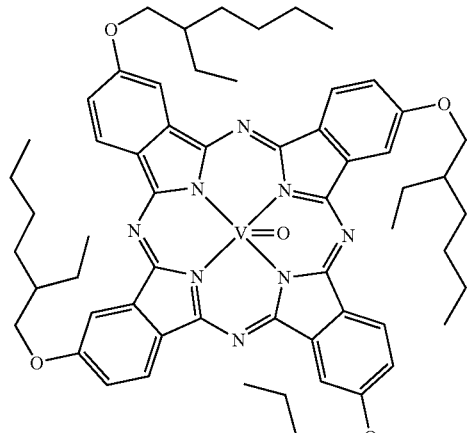
703 nm(MeOH)
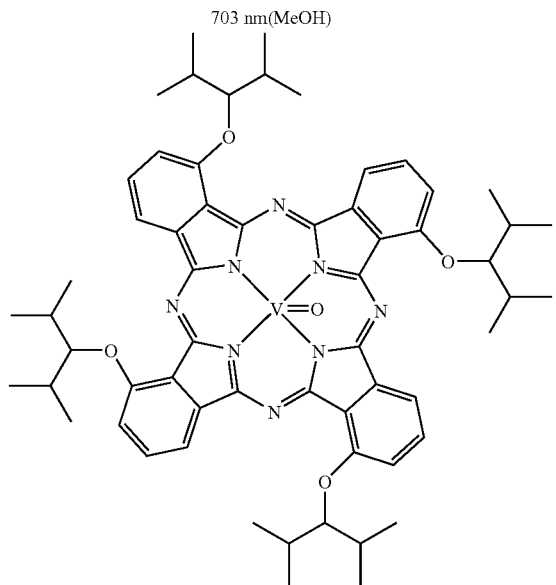
738 nm(Toluene)
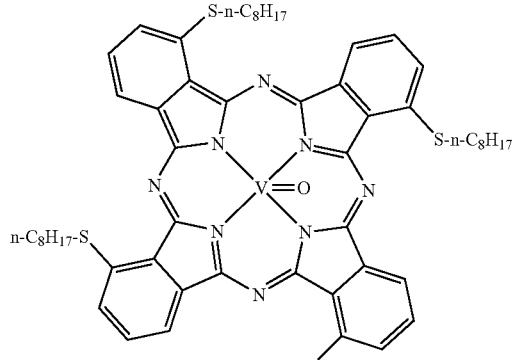
745 nm(Toluene)
-continued
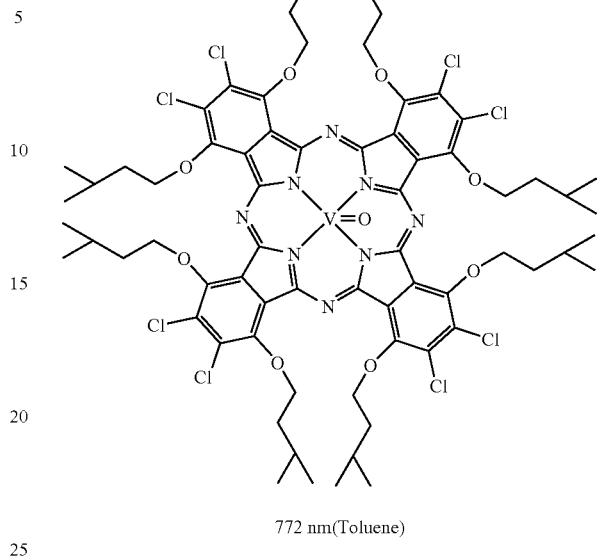
772 nm(Toluene)
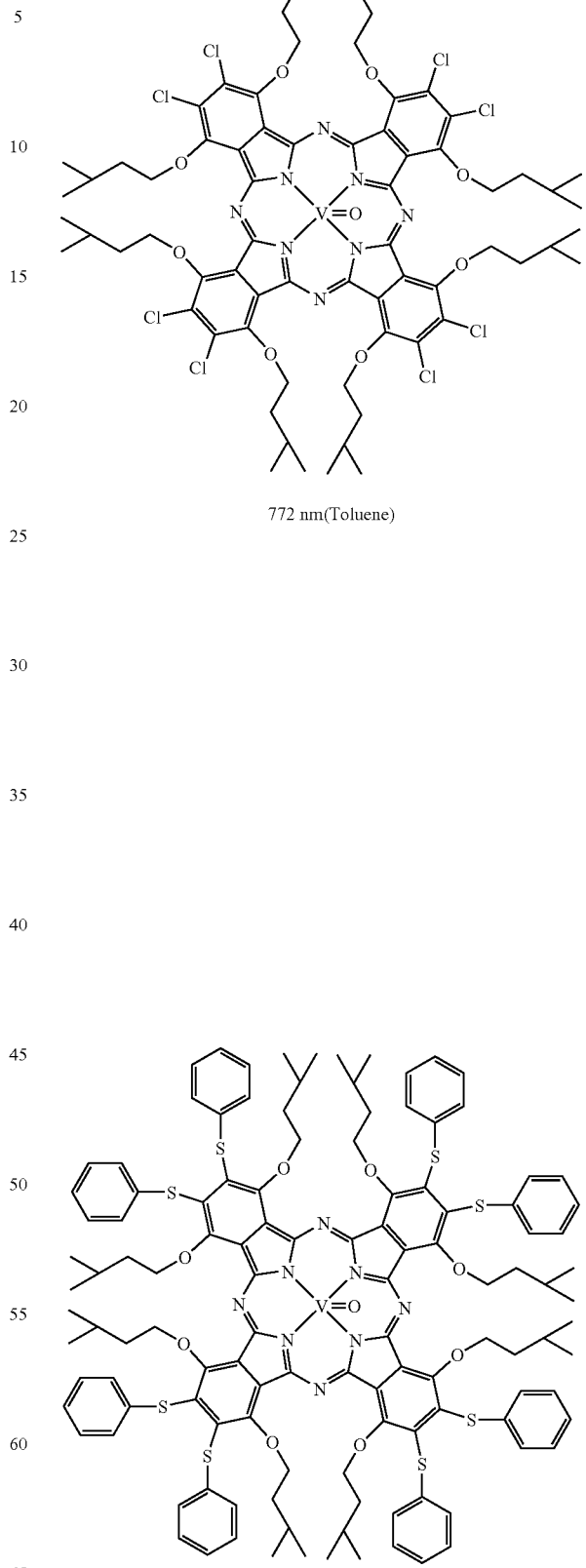
817 nm(Toluene)

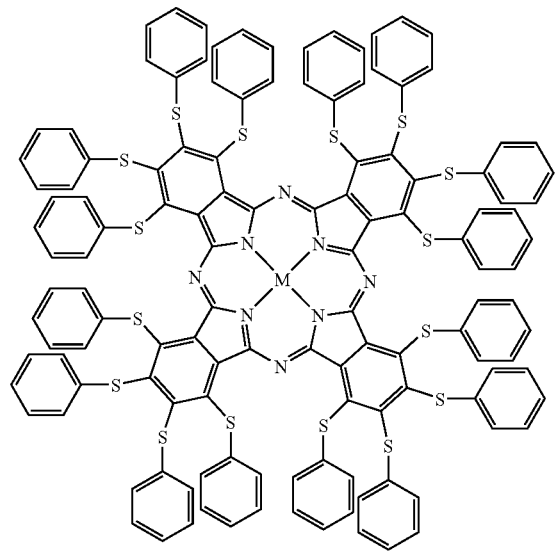
M = Cu; 768 nm(Toluene)
M = VO; 834 nm(Toluene)
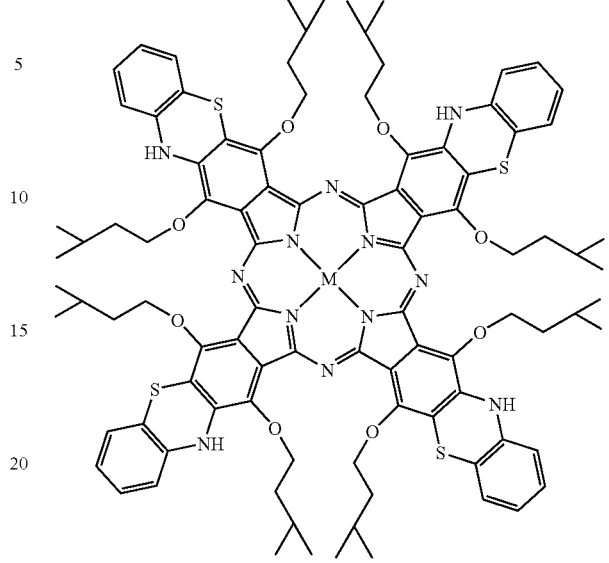
M = Cu; 788 nm(Toluene)
M = VO; 830 nm(Toluene)
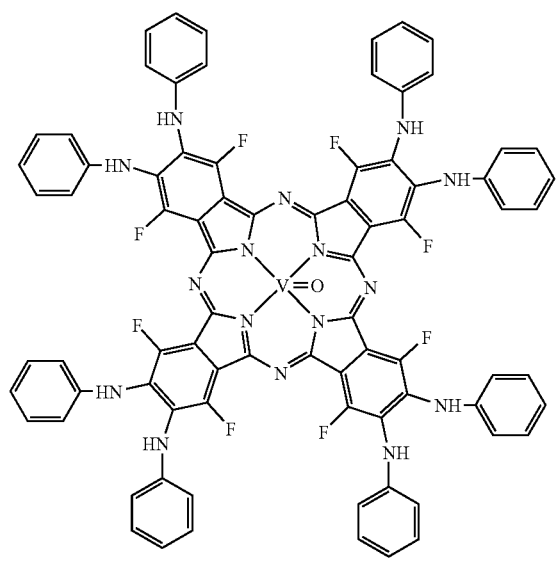
844 nm(MEK)
M = Cu; 933 nm(Toluene)
M = VO; 1006 nm(Toluene)

-continued
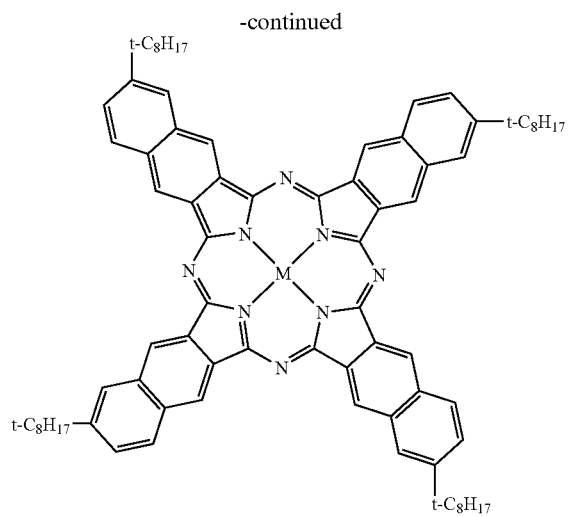
M = Cu; 771 nm(Toluene)
M = VO; 809 nm(Toluene)
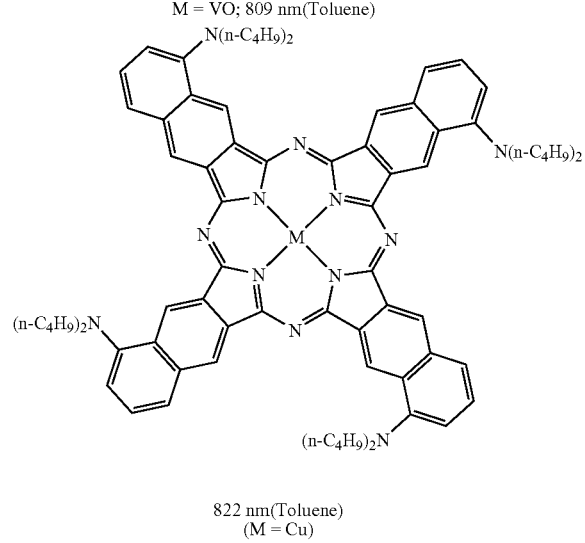
822 nm(Toluene)
(M = Cu)
-continued
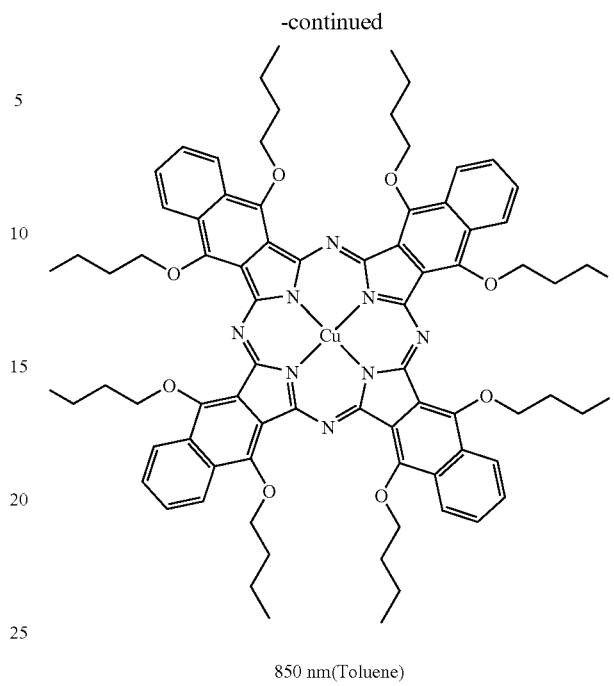
850 nm(Toluene)
Abbreviations in the above-mentioned chemical formulae have meanings described below.
MeOH: methanol
1,2-DCE: 1,2-dichloroethane
DAA: diacetone alcohol
DMSO: dimethyl sulfoxide
MEK: methyl ethyl ketone
Ts: tosyl group
Ph: phenyl group
(dye 1)
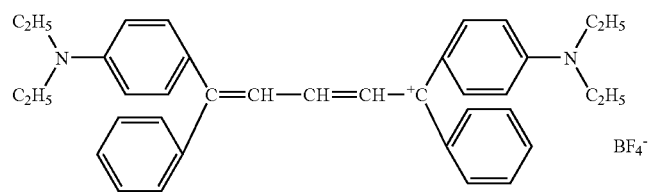
(dye 2)
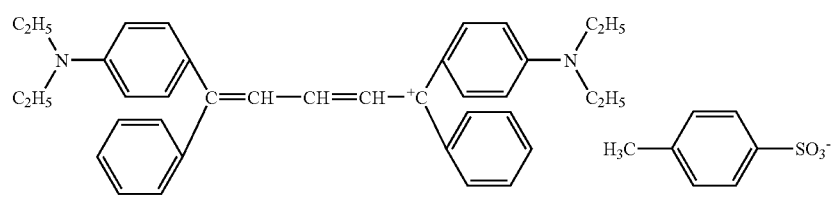
(dye 3)

-continued
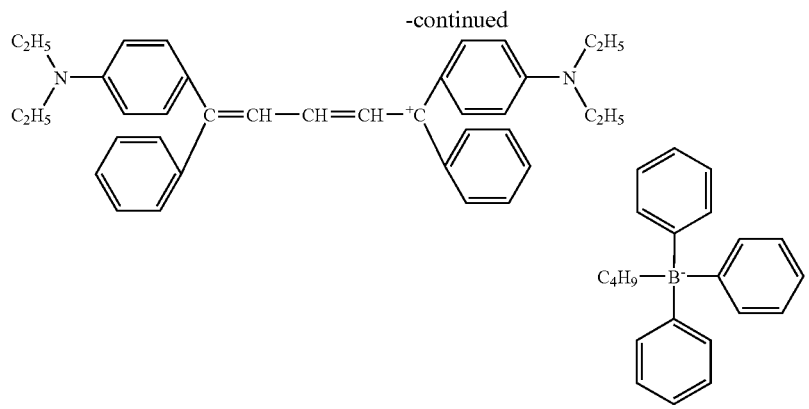
(dye 4)
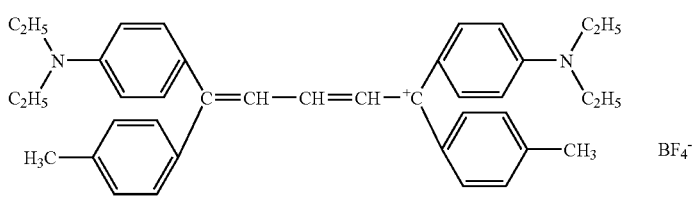
(dye 5)
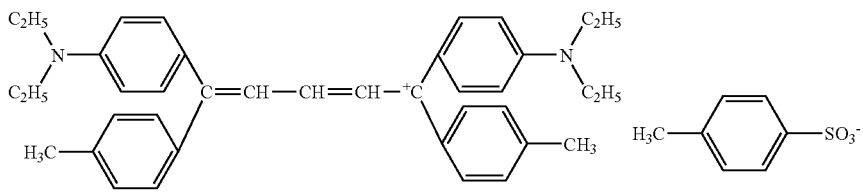
(dye 6)
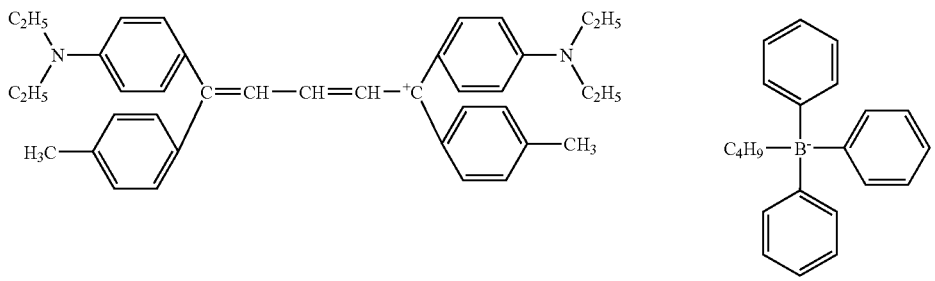
(dye 7)
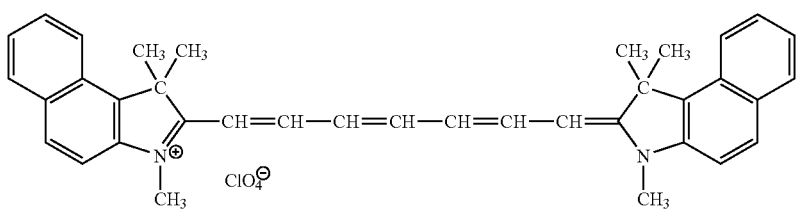
(dye 8)
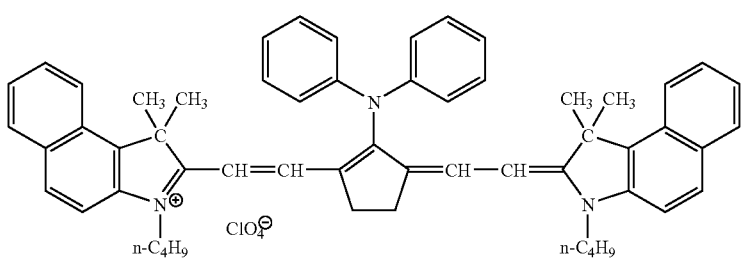

-continued
(dye 9)
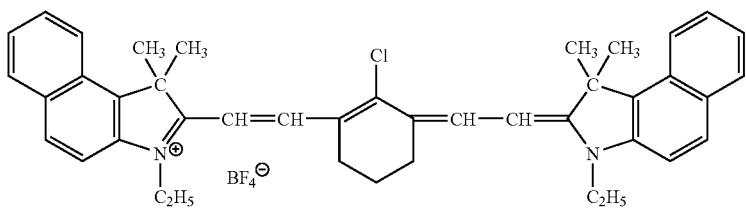
(dye 10)
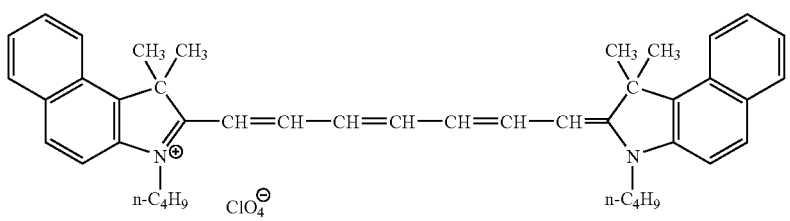
(dye 11)
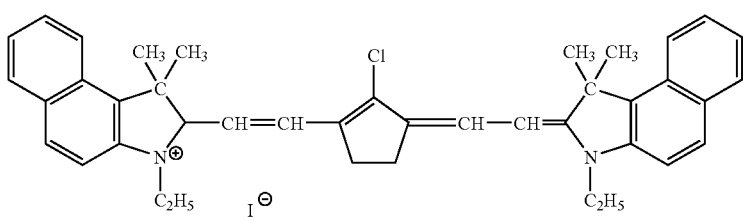
(dye 12)
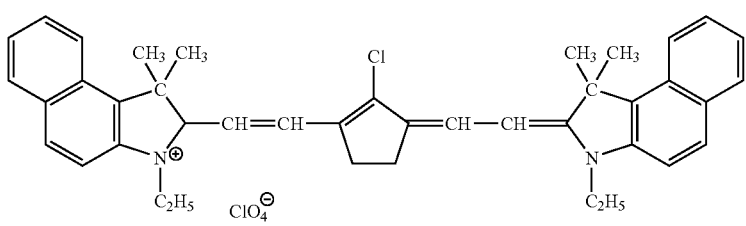
(dye 13)
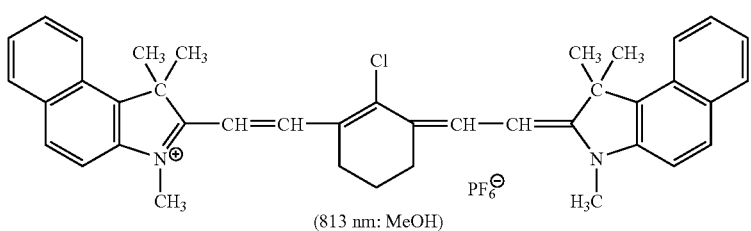
(813 nm: MeOH)
(dye 14)
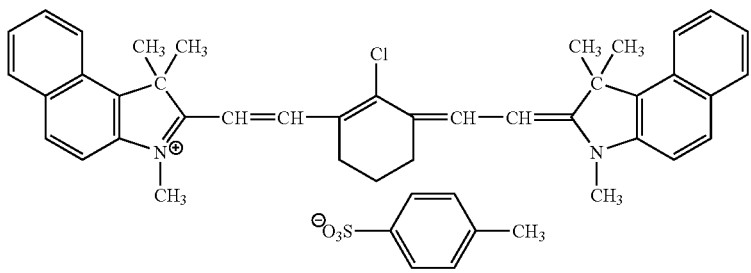
(dye 15)

-continued
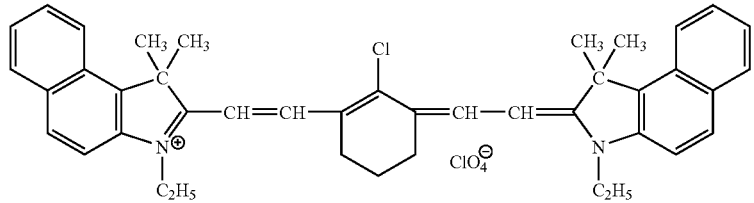
(dye 16)
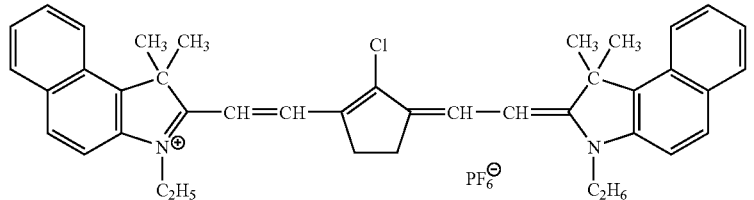
(dye 17)
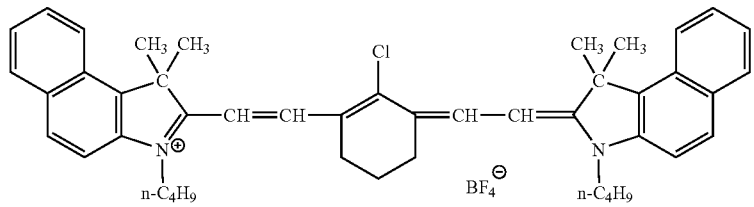
(dye 18)
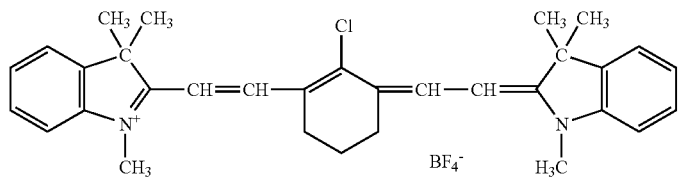
(dye 19)
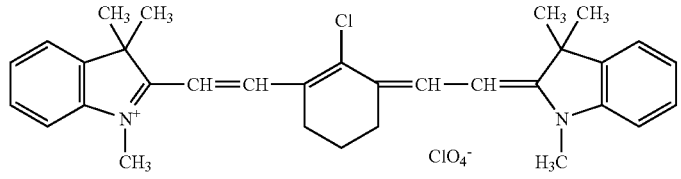
(dye 20)
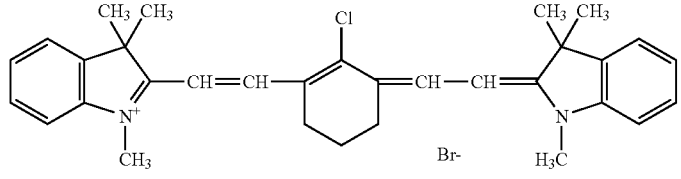
(dye 21)
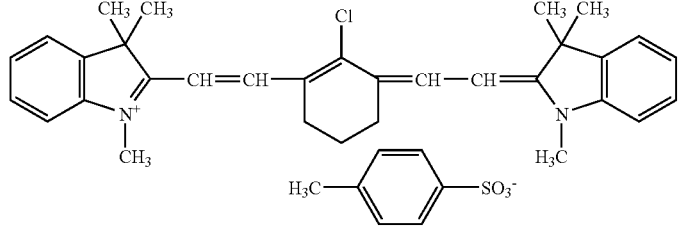
(dye 22)

-continued
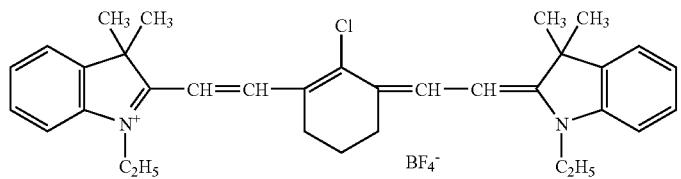
(dye 23)
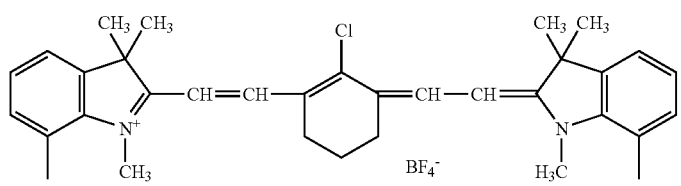
(dye 24)
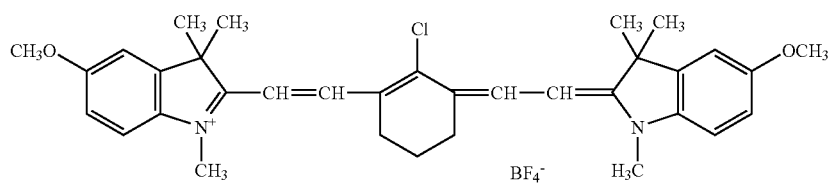
(dye 25)
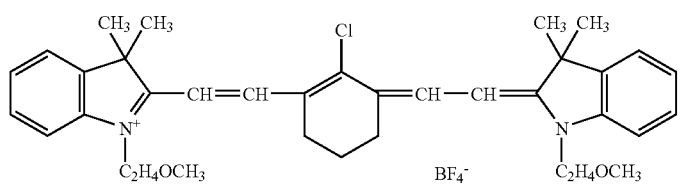
(dye 26)
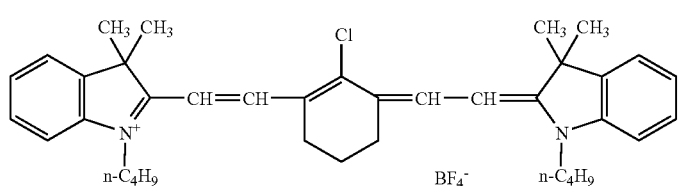
(dye 27)
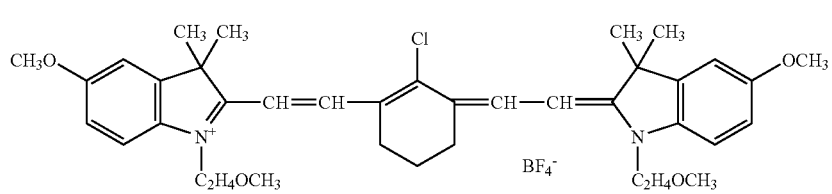
(dye 28)
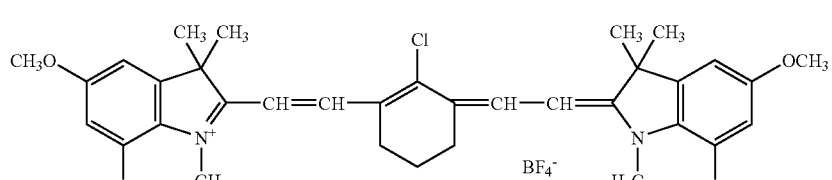
(dye 29)

-continued
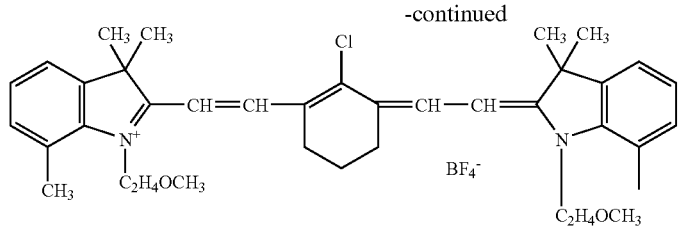
(dye 30)
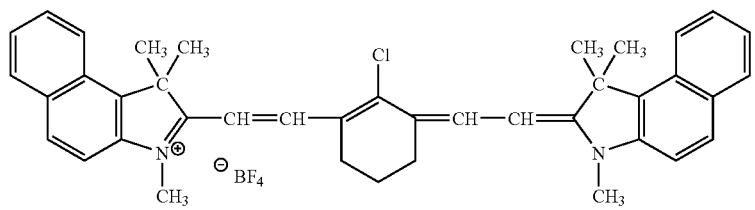
Of them, dye 16 is particularly preferable.
Among these dyes, further, those in which a counter ion is $^-BF_4$ are preferable from the standpoint of storage stability.
Further, the following dyes are exemplified.
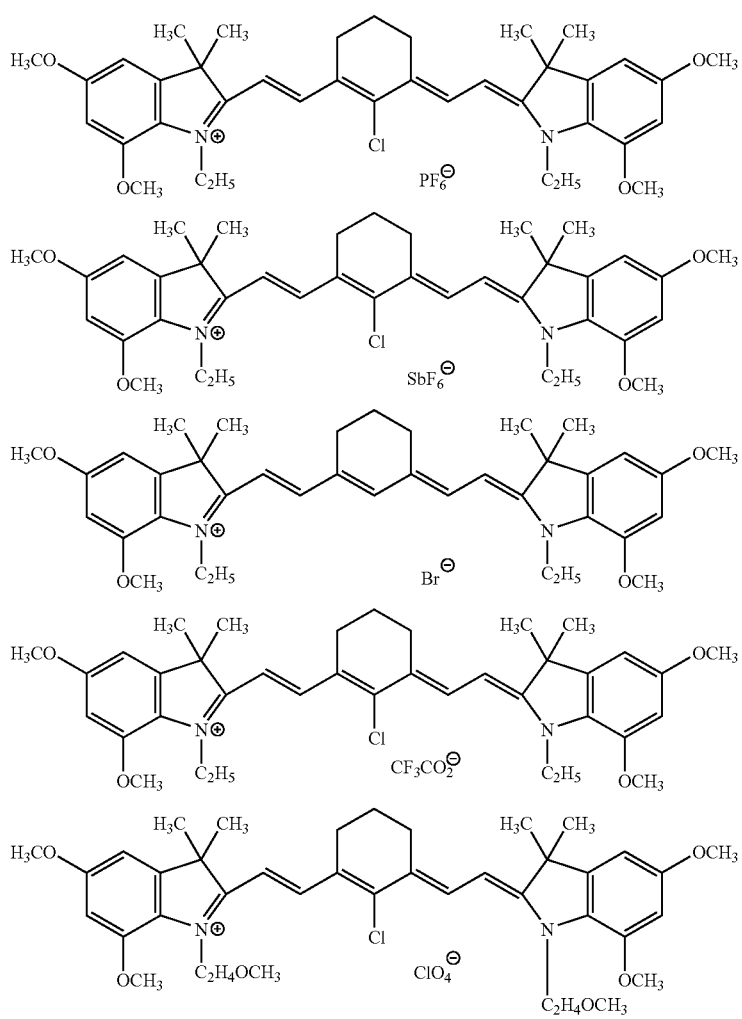

-continued
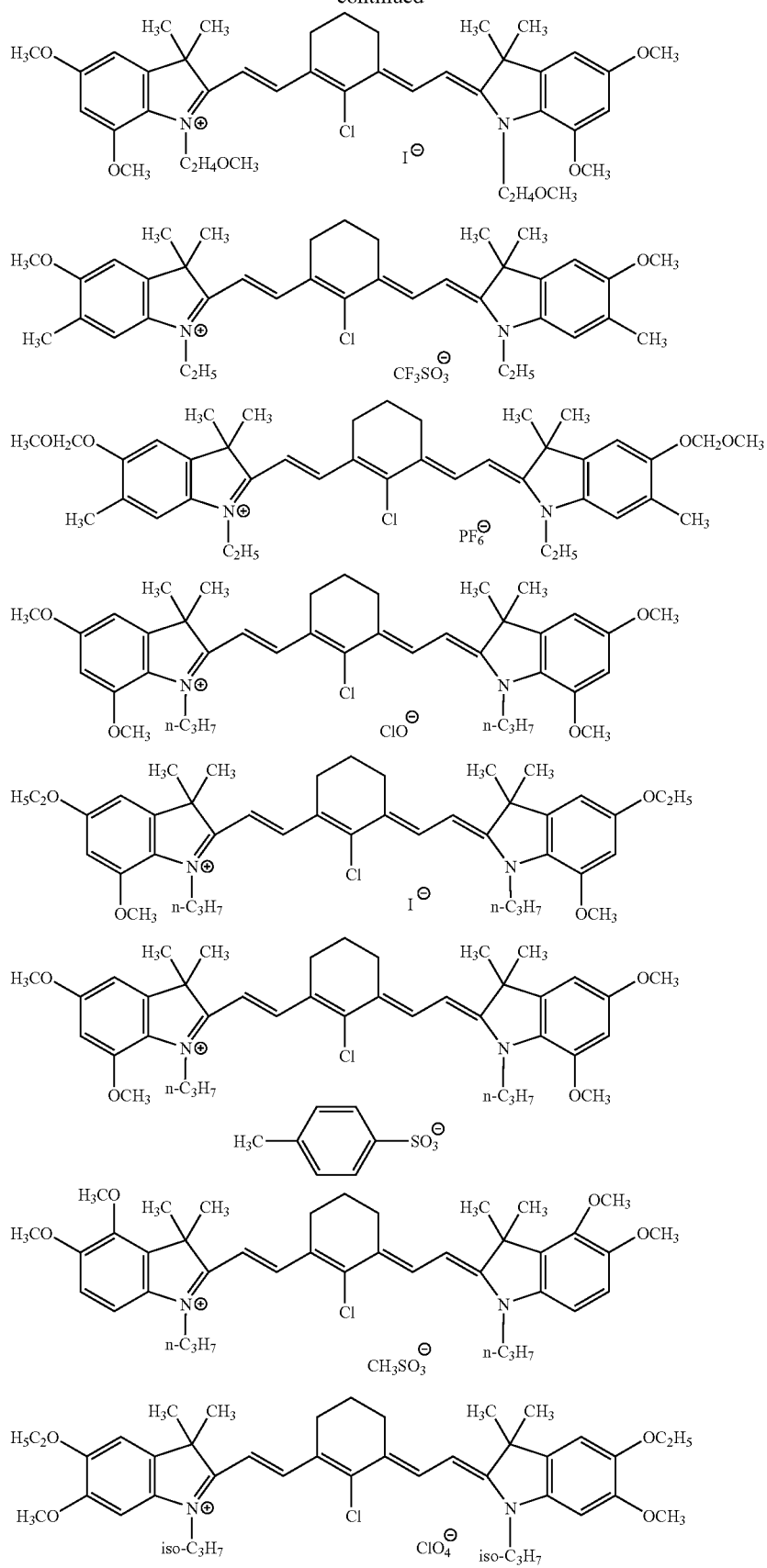

-continued
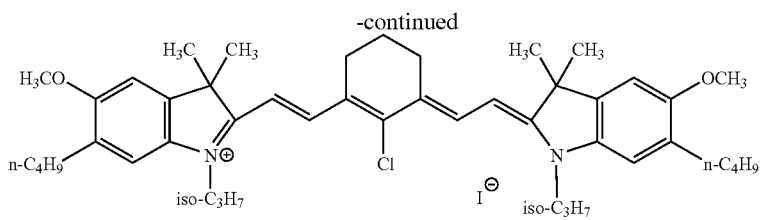
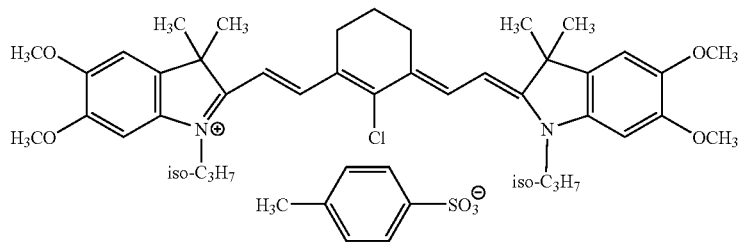
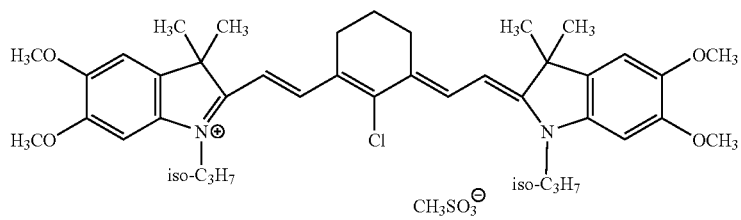
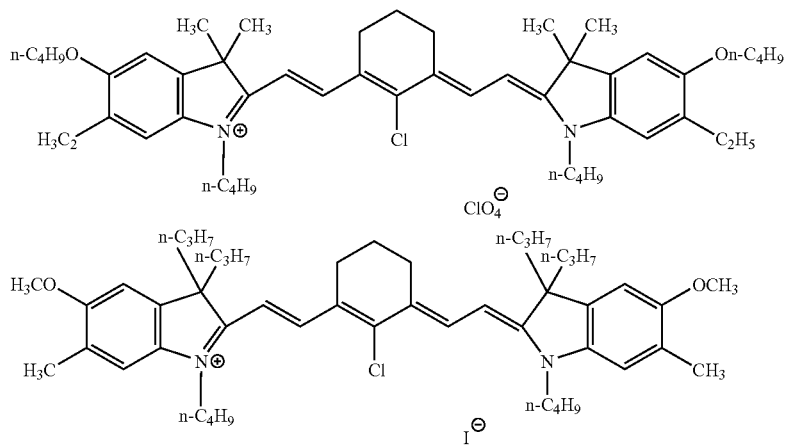
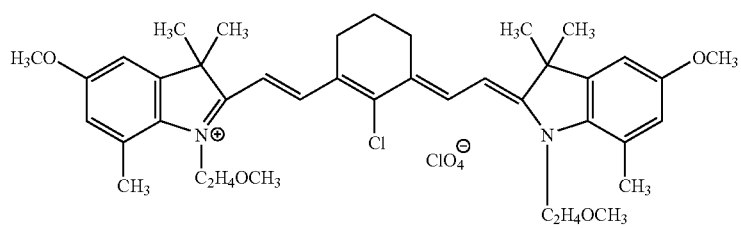
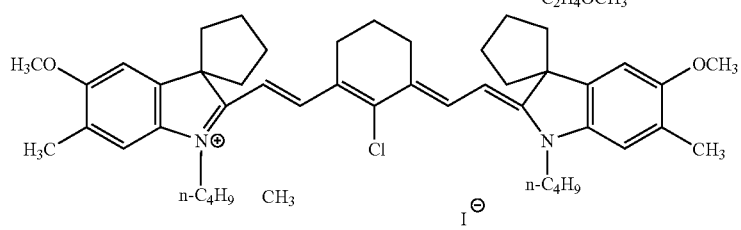

-continued
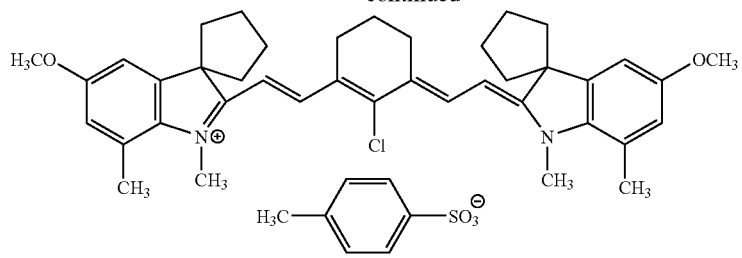
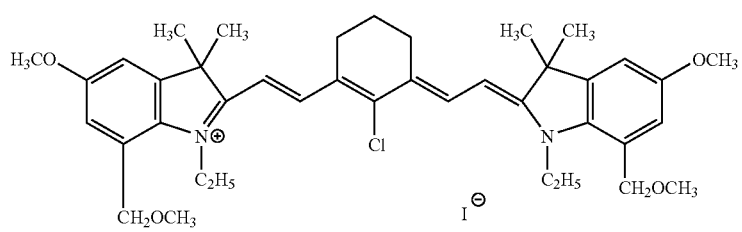
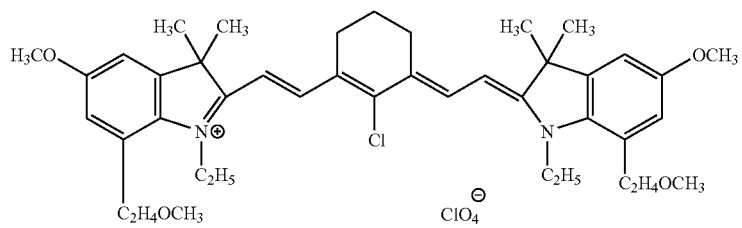
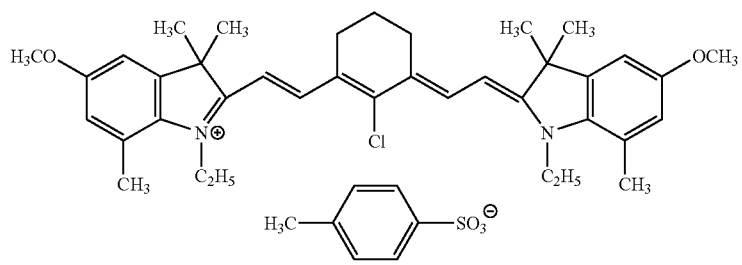
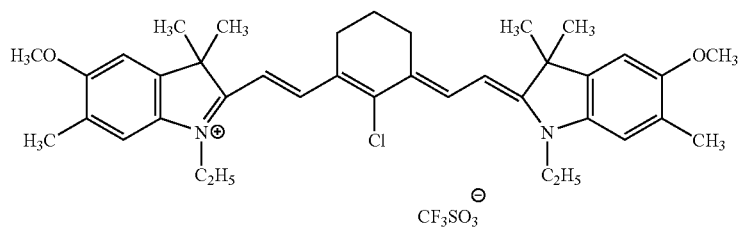
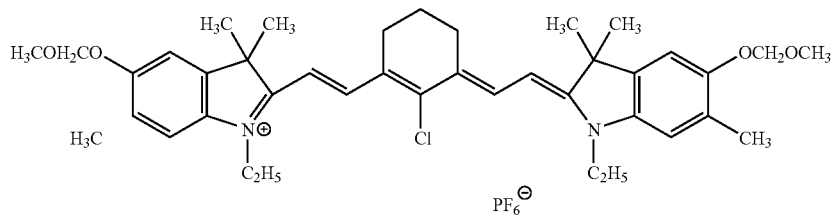
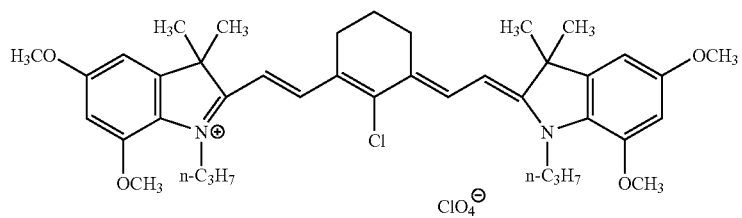

-continued
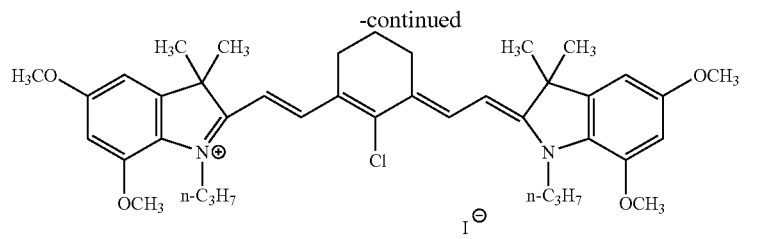
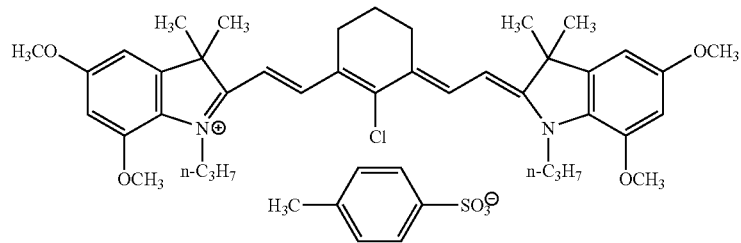
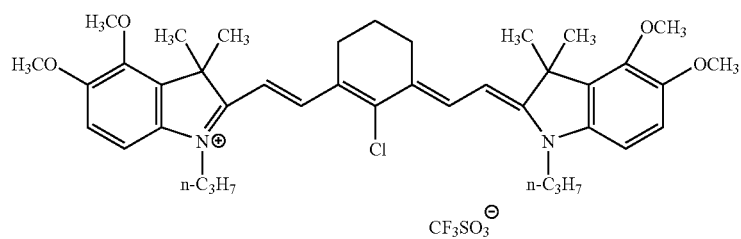
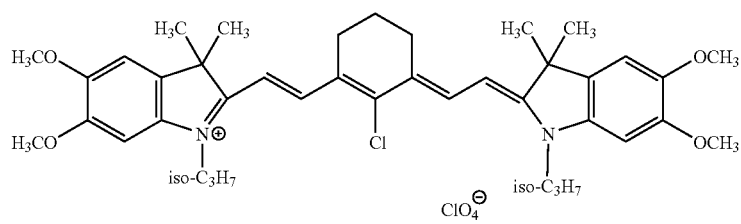
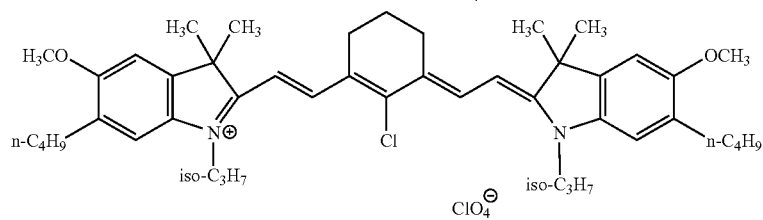
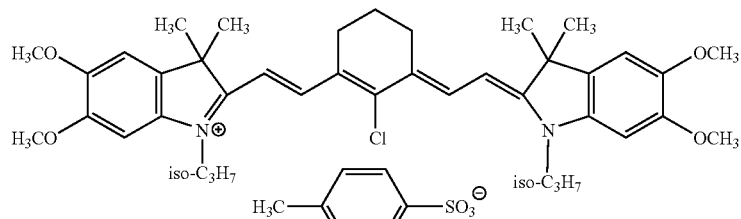
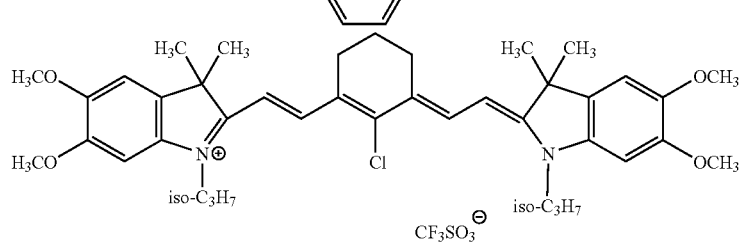

-continued
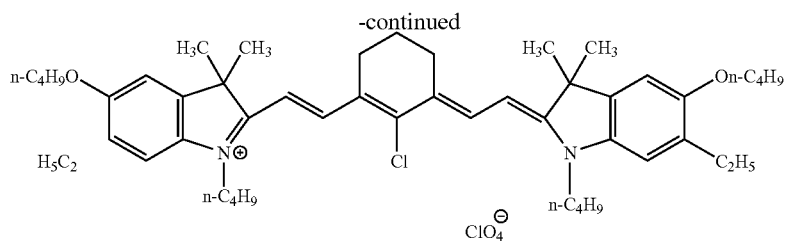
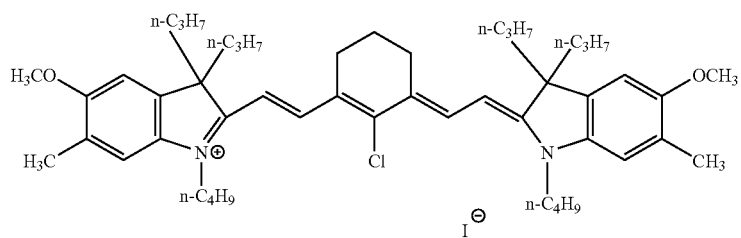
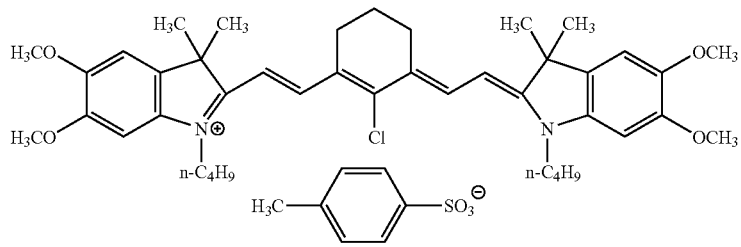
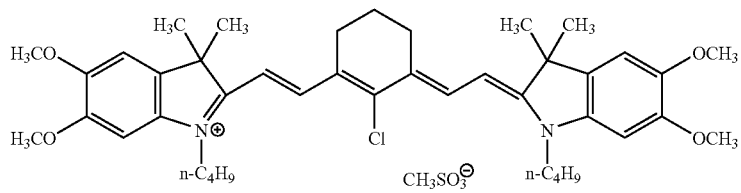
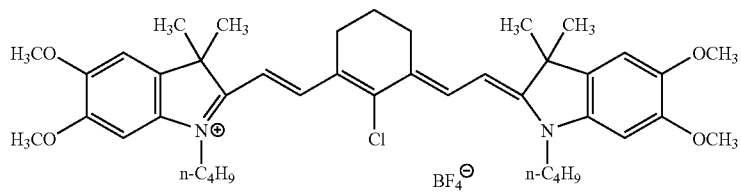
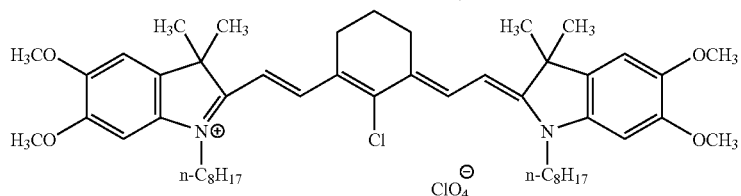
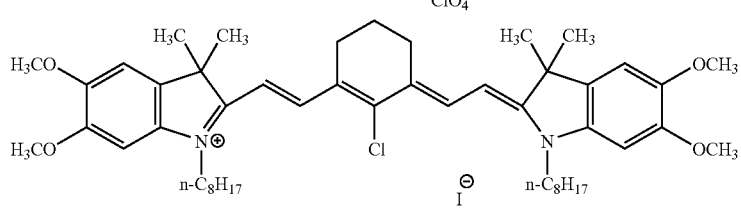

-continued
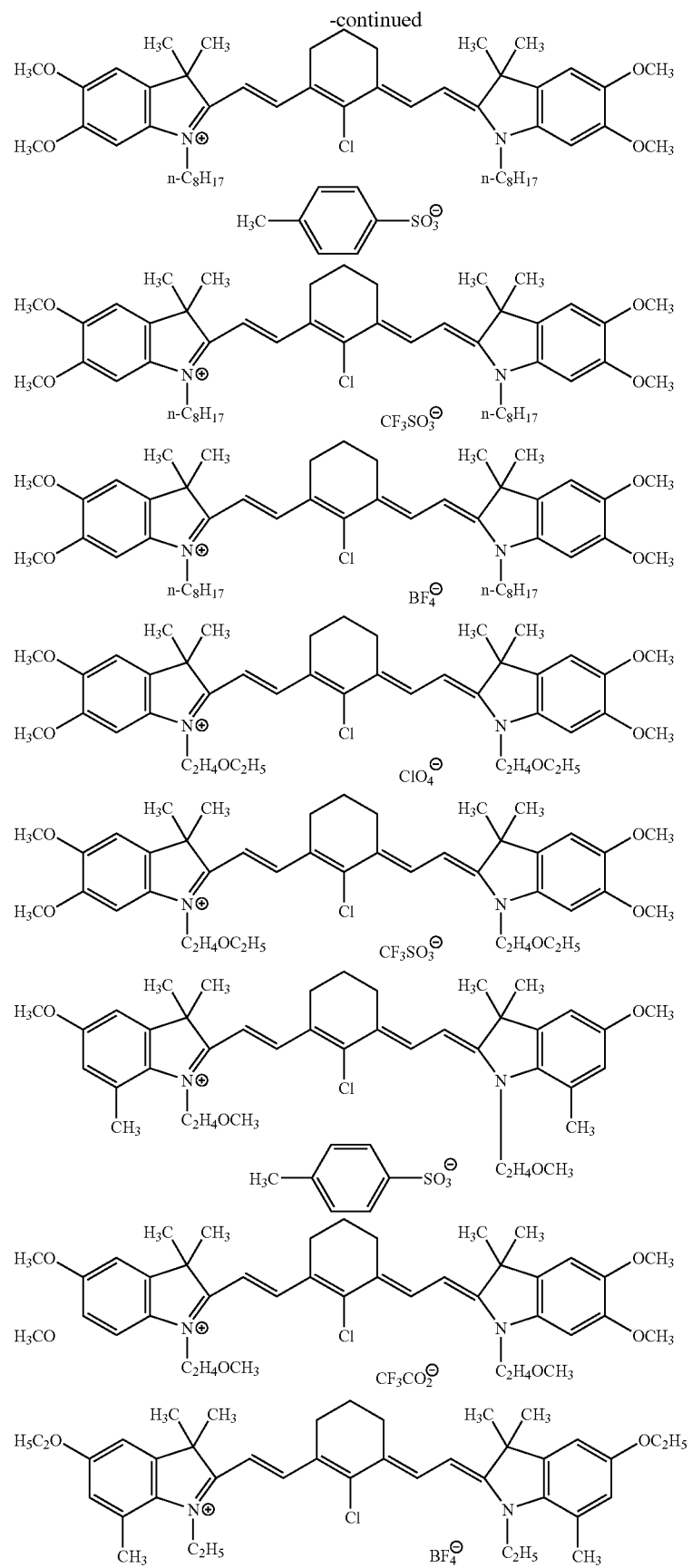

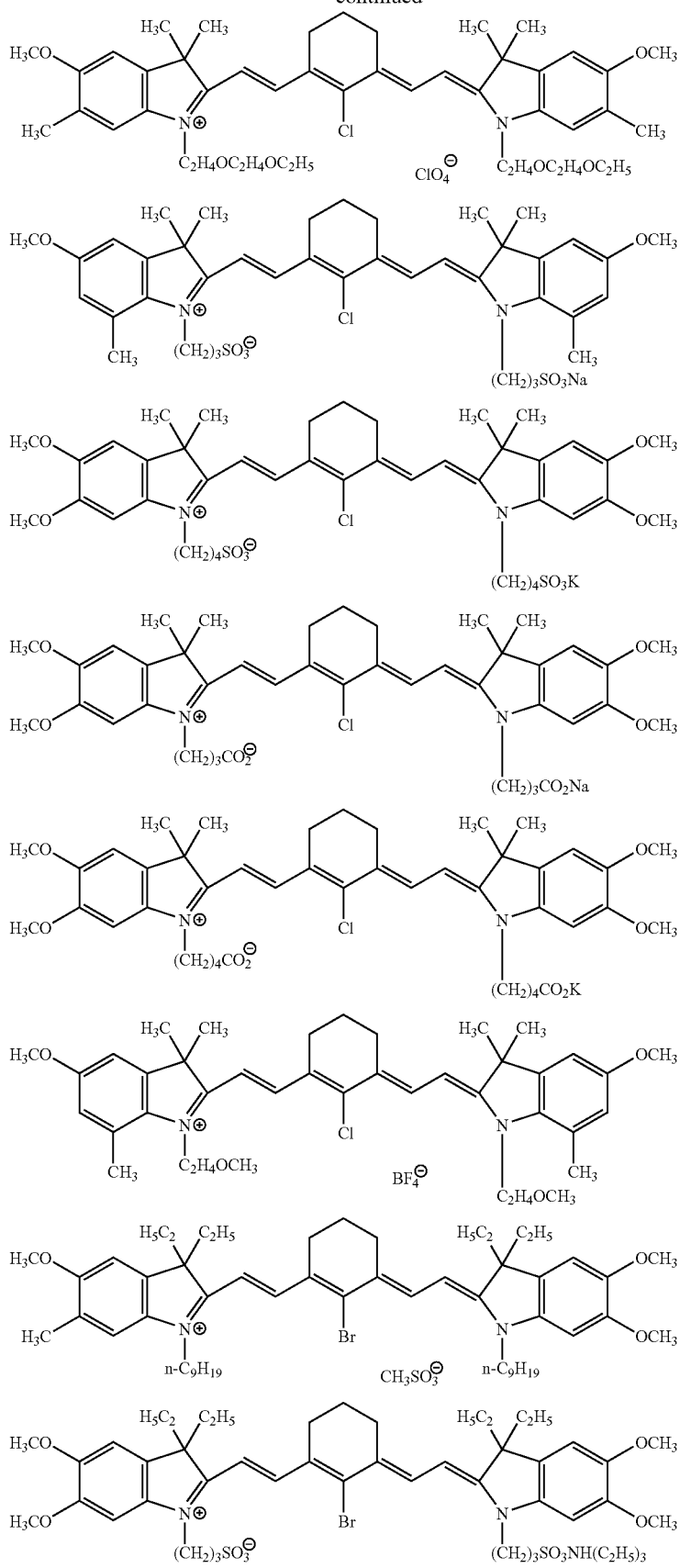

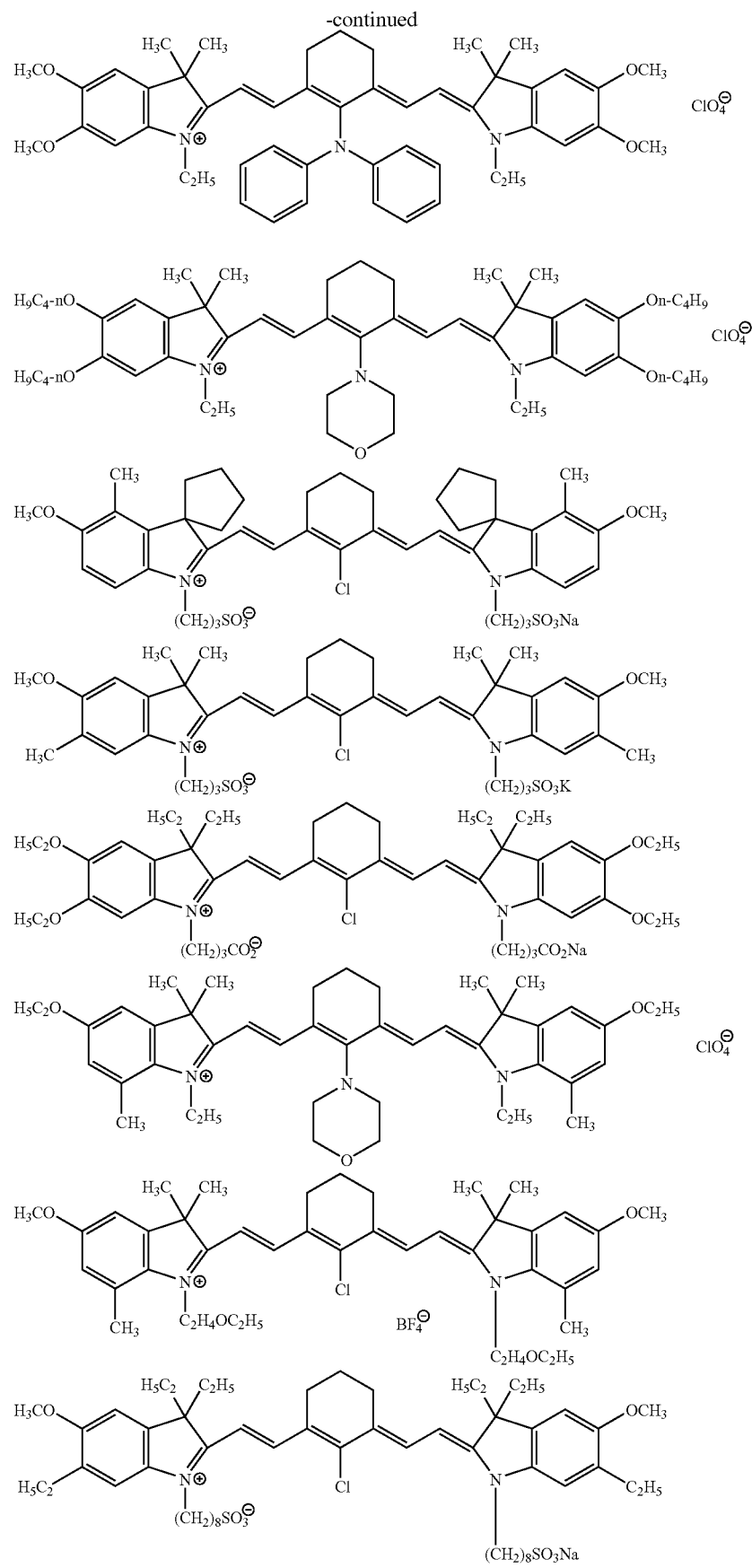

Specific examples of commercially available preferable photothermal converting substances include, but not limited to, "KAYASORB" series CY-10, CY-17, CY-5, CY-4, CY-2, CY-20 and CY-30, and IRG-002 (these are manufactured by Nippon Kayaku Co., Ltd.); YKR-4010, YKR-3030, YKR-3070, YKR-2900, SIR-159, PA-1005, SIR-128, YKR-2080 and PA-1006 (these are manufactured by Yamamoto Chemicals, Inc.); "PROJECT" 825LDI, "PROJECT" 830NP, S174963, S174270 (these are manufactured by Avecia Limited); NK-2014, NK-2911, NK-2912, NK-4432, NK-4474, NK-4489, NK-4680, NK-4776, NK-5020, NK-5036 and NK-5042 (these are manufactured by Hayashibara Biochemical Laboratories, Inc.); IR2T, IR3T (these are manufactured by Showa Denko K.K.): "EXCOLOR" 801K, IR-1, IR-2, "TX-EX-801B" and "TX-EX-805K" (these are manufactured by Nippon Shokubai Co., Ltd.); CIR-1080 (manufactured by Japan Carlit Co., Ltd.); IR98011, IR980301, IR980401, IR980402, IR980405, IR980406 and IR980504 (these are manufactured by YAMADA CHEMICAL K.K.); and "EPOLIGHT" V-149, V-129, V-63, III-184, III-192, IV-62B, IV-67, VI-19, VI-148 (these are manufactured by EPOLIN, INC.), and the like.

The content of the photothermal converting substance in a positive resist composition of the present invention can be preferably 0.5 to 40 wt %, more preferably 1 to 35 wt % based on the total amount of the components (A), (B) and (C).

The kind of the photothermal converting substance and its compounding amount are also selected so that the substance itself, or in combination with components (A) and (C), gives a property as a desired positive resist, and it is preferable that the kind and the composition are so set that, for example, an exposure treatment in a complete bright room such as under a white light and the like is possible, desired sensitivity and resolution are obtained at the strength of laser lights in the near infrared region used for exposure, further, a baking treatment is unnecessary in forming a coated film and a layer to be formed by a positive resist composition of the present invention.

The thermal acid generator as the component (C) is that which can generate, by the action of heat generated from a photothermal converting substance by irradiation with a light, an acid acting on a vinyl-based polymer as the component (A) and imparting solubility in a developer to this polymer, and for example, those contained as a thermal acid generator in resist compositions, photosensitive compositions and the like such as an organic sulfonium salt, benzothiazolium salt, ammonium salt, phosphonium salt and the like can be used. Further, among photoacid generators contained in various positive resist compositions, those which can generate an acid under heat generation of the photothermal converting substances mentioned above can also be used.

As such photoacid generators, exemplified are (1) salts of diazonium, phosphonium, sulfonium and iodonium with a fluorine ion, chlorine ion, bromine ion, iodine ion, inorganic acid anions such as a perchlorate ion, periodate ion, hexafluorinated phosphate ion, hexafluorinated antimonate ion, hexafluorinated stannate ion, phosphate ion, fluoroborate ion, tetrafluorinated borate ion and the like, or organic acid anions such as a thiocyanate ion, benzenesulfonate ion, naphthalenesulfonate ion, naphthalenedisulfonate ion, p-toluenesulfonate ion, alkylsulfonate ion, benzenearboxylate ion, alkylcarboxylate ion, trihaloalkylcarboxylate ion, alkylsulfate ion, trihaloalkylsulfate ion, nicotinate ion and the like, further, with organic metal complex anions such as azo-based, bisphenyldithiol-based, thiocatechol chelate-based, thiobisphenolate chelate-based, bisdiol-a-diketone-based anions and the like; oxazole derivatives; triazine derivatives; disulfone derivatives; sulfonate derivatives; diazosulfone derivatives; aromatic sulfone derivatives; organometals; organohalogen compounds and the like.

As the oxazole derivatives and triazine derivates, preferably mentioned are oxazole derivatives represented by the following general formula (PAG1) including substitution with a trihalomethyl group and s-triazine derivatives represented by the general formula (PAG2) including substitution with a trihalomethyl group.

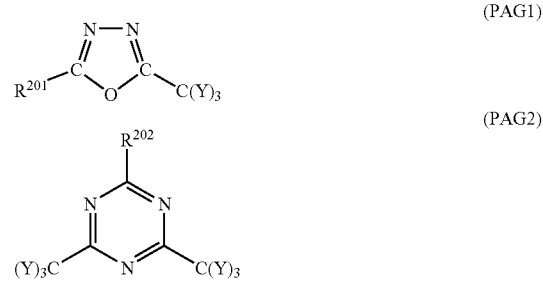

In the formulae, $R^{201}$ represents a substituted or unsubstituted aryl group, or substituted or unsubstituted alkenyl group, $R^{202}$ represents a substituted or unsubstituted aryl group, substituted or unsubstituted alkenyl group, substituted or unsubstituted alkyl group, or —$C(Y)_3$. Y represents a chlorine atom or bromine atom.

Preferable examples of substituents on the above-mentioned groups include a hydroxyl group; alkoxy groups such as for example a methoxy group, ethoxy group, propoxy group, butoxy group and the like; halogen atoms such as for example chlorine, bromine, fluorine and the like; cyano group; dialkylamino groups such as for example a dimethylamino group, diethylamino group and the like; silyl group; substituted silyl groups such as for example a trimethylsilyl group, triethylsilyl group, tert-butyldimethylsilyl group, triphenylsilyl group and the like; siloxy groups such as for example a tert-butyldimethylsiloxy group and the like; sulfonate group, alkylcarbonyloxy group, alkylamide group, alkylsulfoneamide group, alkoxycarbonyl group, alkylamino group, alkylcarbamoyl group, alkylsulfamoyl group, alkoxy group, aryloxy group, aryloxycarbonyl group, alkylthio group, arylthio group, alkyl group, aryl group, carboxyl group, halogen atom (e.g., a chlorine atom, bromine atom, fluorine atom and the like), trifluoroacetyl group, cyano group, acyl group (e.g., an acetyl group, propionyl group, trifluoroacetyl group), acyloxy group (e.g., an acetoxy group, propionyloxy group, trifluoroacetoxy group and the like), alkylsulfonyl group, aryl sulfonyl group, cyano group, nitro group and the like.

Specific examples thereof include, but not limited to, the following compounds.

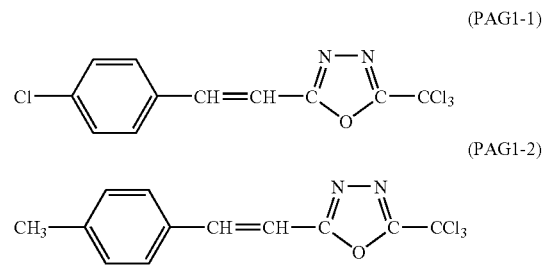

-continued
(PAG1-3)
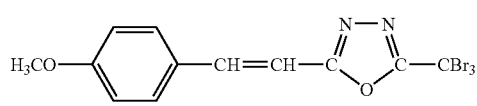
(PAG1-4)
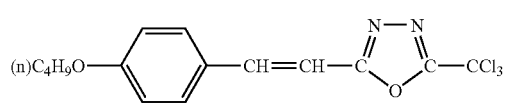
(PAG1-5)
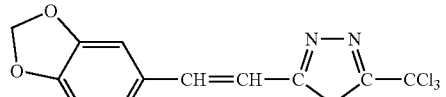
(PAG1-6)
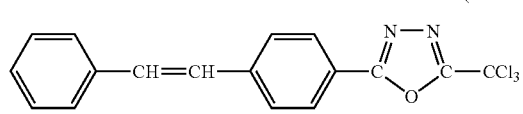
(PAG1-7)
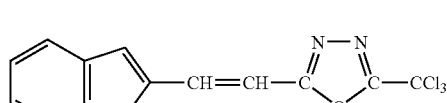
(PAG1-8)
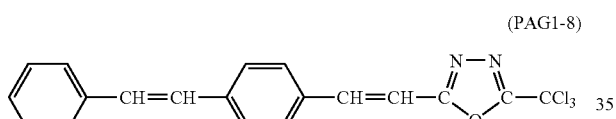
(PAG2-1)
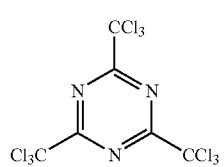
(PAG2-2)
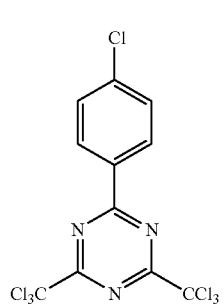
(PAG2-3)
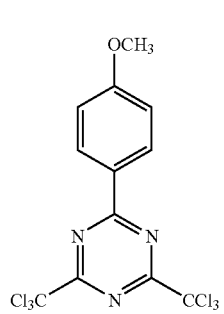
-continued
(PAG2-4)
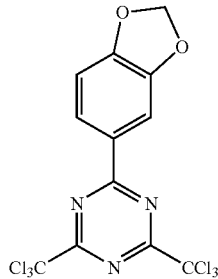
(PAG2-5)
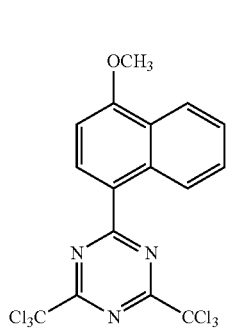
(PAG2-6)
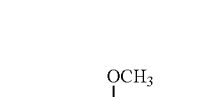
(PAG2-7)
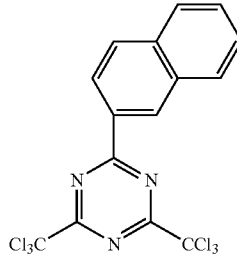
(PAG2-8)
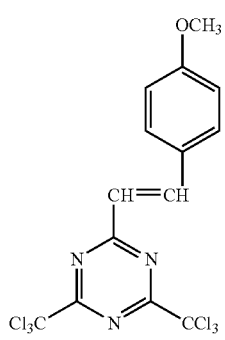

-continued

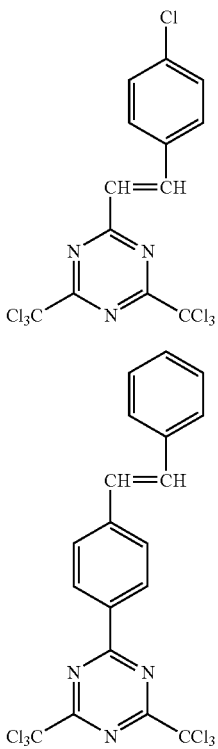

(PAG2-9)

(PAG2-10)

As the iodonium salts and sulfonium salts, preferably mentioned are iodonium salts represented by the following general formula (PAG3) and sulfonium salts represented by the general formula (PAG4).

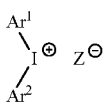

(PAG3)

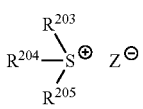

(PAG4)

Here, $Ar^1$, $Ar^2$ represent each independently a substituted or unsubstituted aryl group. $R^{203}$, $R^{204}$, $R^{205}$ represent each independently a substituted or un-substituted alkyl group, or substituted or unsubstituted aryl group.

Preferable examples of substituents on the above-mentioned groups include a hydroxyl group; alkoxy groups such as for example a methoxy group, ethoxy group, propoxy group, butoxy group and the like; halogen atoms such as for example chlorine, bromine, fluorine and the like; cyano group; dialkylamino groups such as for example a dimethylamino group, diethylamino group and the like; silyl group; substituted silyl groups such as for example a trimethylsilyl group, triethylsilyl group, t-butyldimethylsilyl group, triphenylsilyl group and the like; siloxy groups such as for example a t-butyldimethylsiloxy group and the like; sulfonate group, alkylcarbonyloxy group, alkylamide group, alkylsulfoneamide group, alkoxycarbonyl group, alkylamino group, alkylcarbamoyl group, alkylsulfamoyl group, alkoxy group, aryloxy group, aryloxycarbonyl group, alkylthio group, arylthio group, alkyl group, aryl group, carboxyl group, halogen atom (e.g., a chlorine atom, bromine atom, fluorine atom and the like), trifluoroacetyl group, cyano group, acyl group (e.g., an acetyl group, propionyl group, trifluoroacetyl group), acyloxy group (e.g., an acetoxy group, propionyloxy group, trifluoroacetoxy group and the like), alkylsulfonyl group, aryl sulfonyl group, cyano group, nitro group and the like.

$Z^-$ represents a counter anion, and examples thereof include, but not limited to, $BF_4^-$, $AsF_6^-$, $PF_6^-$, $SbF_6^-$, $SiF_6^{2-}$, $ClO_4^-$; perfluoroalkanesulfonate anions such as $CF_3SO_3^-$ and the like; substituted benzenesulfonate anions such as a toluenesulfonate anion, dodecylbenzenesulfonate anion, pentafluorobenzenesulfonate anion and the like, condensed poly-nuclear aromatic sulfonate anions such as a naphthalene-1-sulfonate anion, anthraquinonesulfonate anion and the like; sulfonic group-containing dyes, and the like.

Two of $R^{203}$, $R^{204}$ and $R^{205}$, and $Ar^1$ and $Ar^2$ may be connected via a single bond or a substituent. Specific examples thereof include, but not limited to, the following compounds.

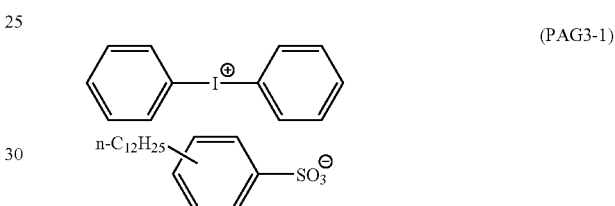

(PAG3-1)

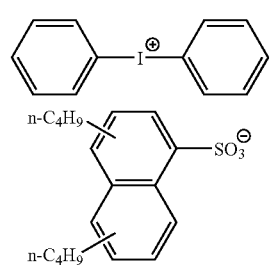

(PAG3-2)

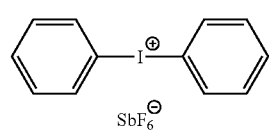

(PAG3-3)

(PAG3-4)

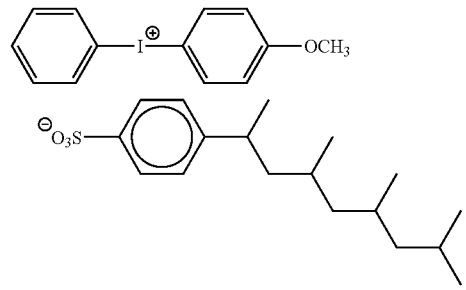

(PAG3-5)

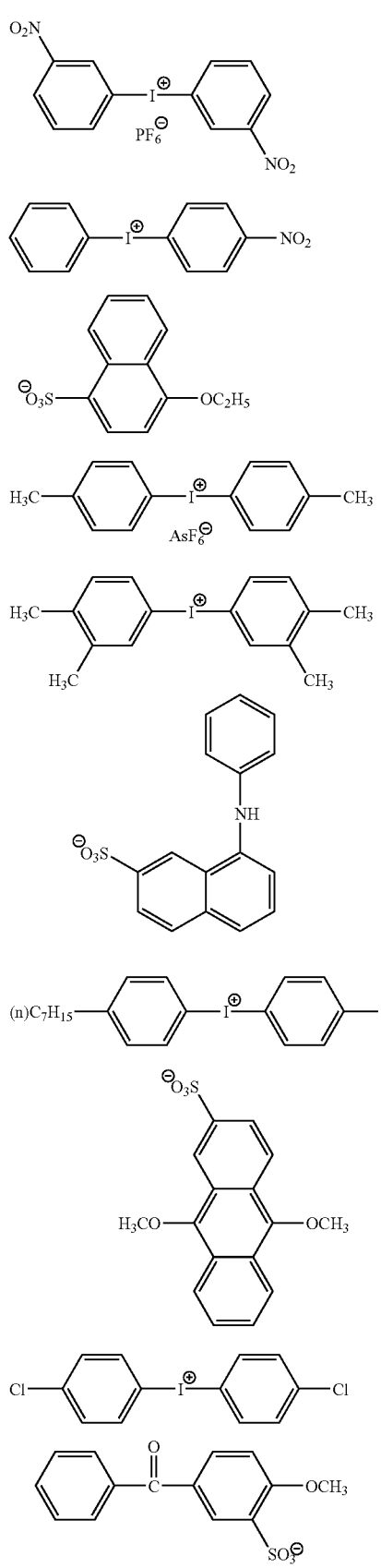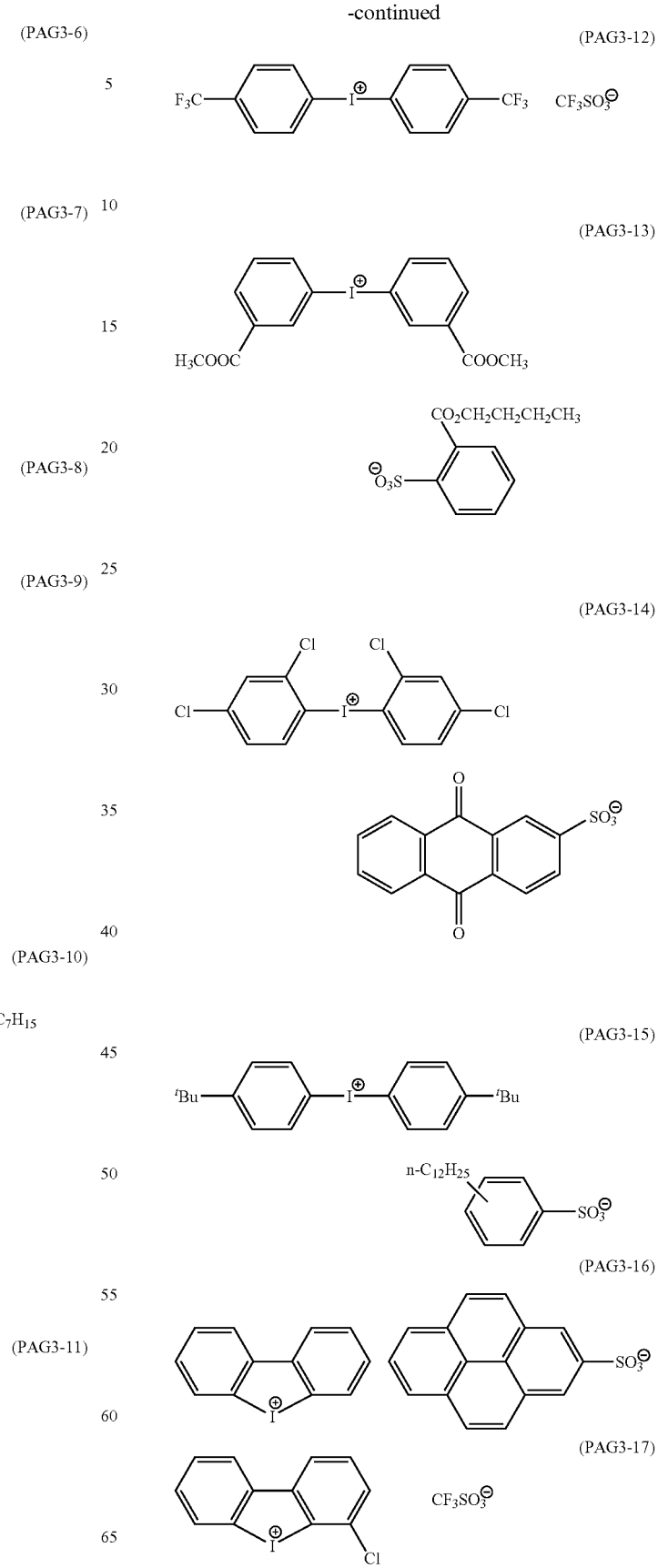

-continued
(PAG3-18)
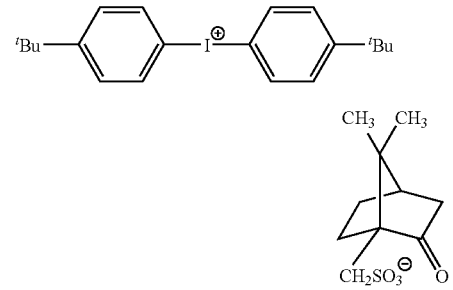
(PAG3-19)
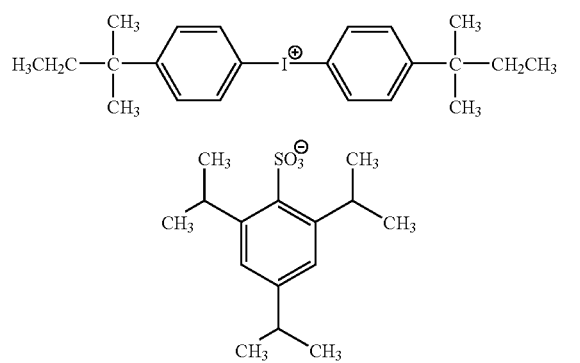
(PAG3-20)
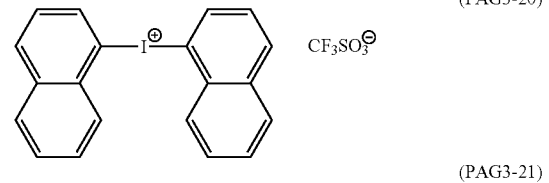
(PAG3-21)
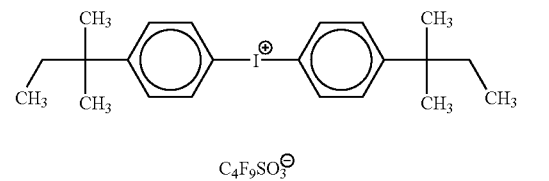
'Bu represents a tert-butyl group.
(PAG3-22)
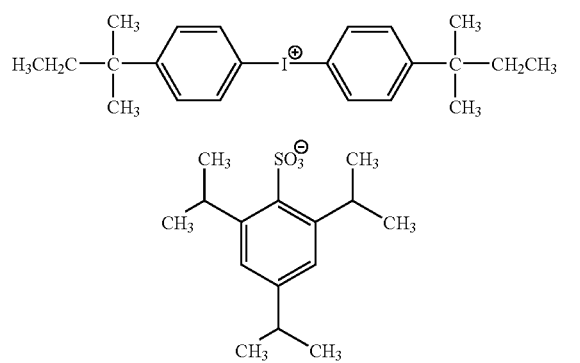
-continued
(PAG3-23)
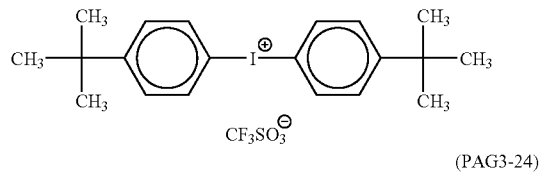
(PAG3-24)
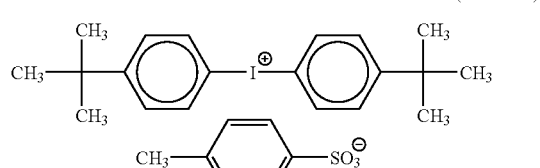
(PAG3-25)
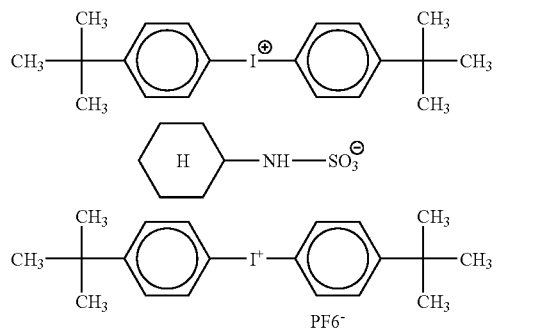
(PAG4-1)
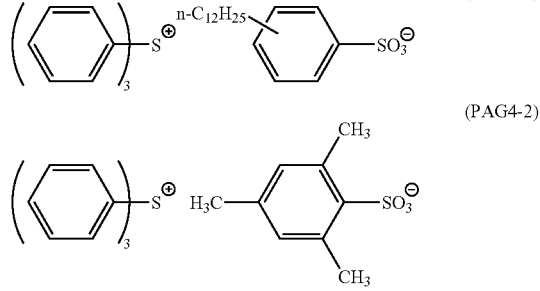
(PAG4-2)
(PAG4-3)
(PAG4-4)
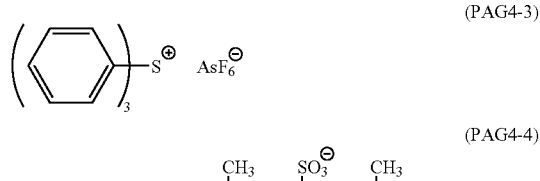
(PAG4-5)
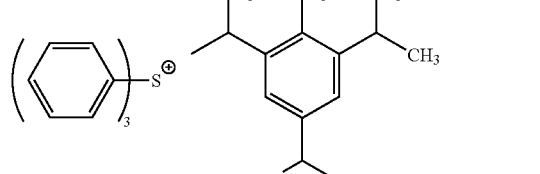
(PAG4-6)
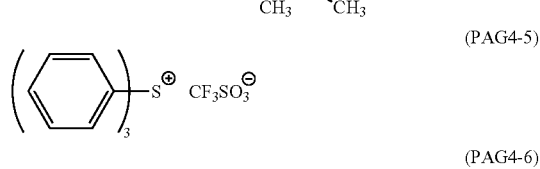

-continued
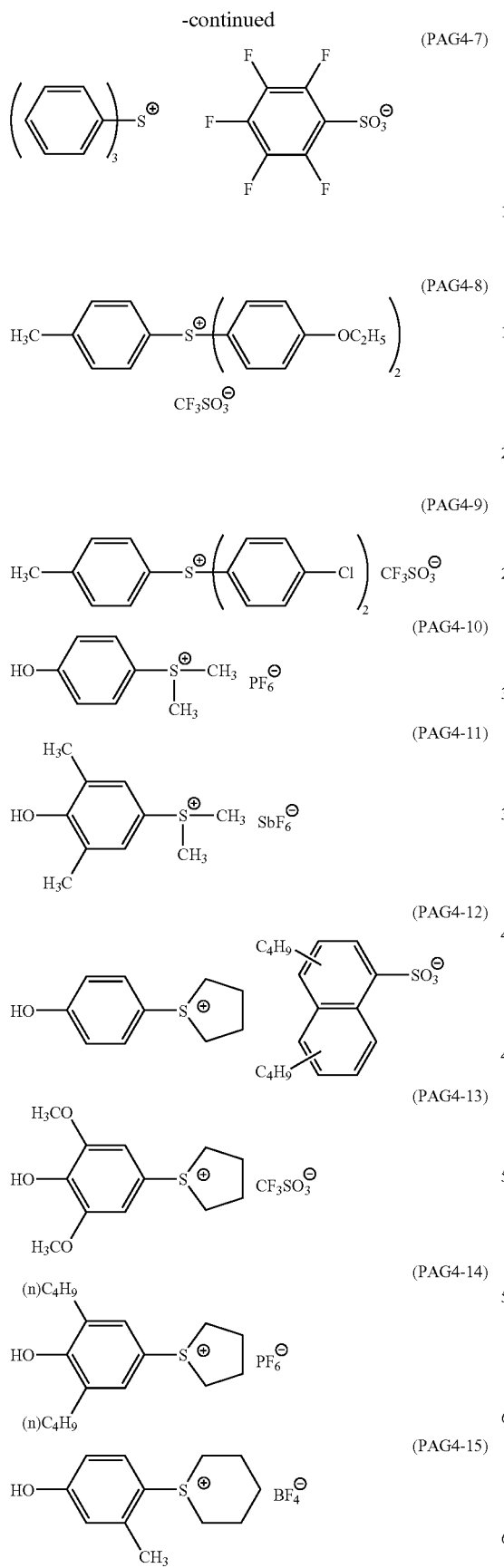
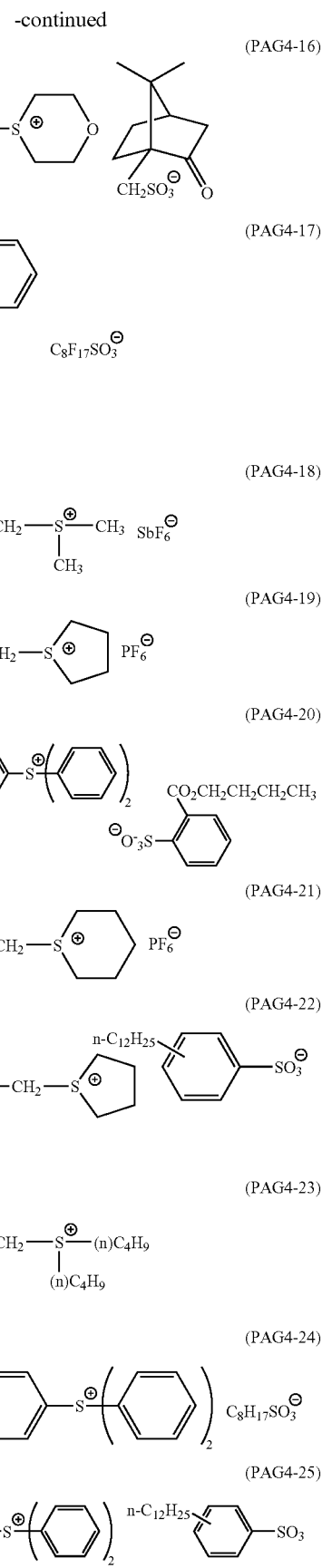

-continued
(PAG4-26) 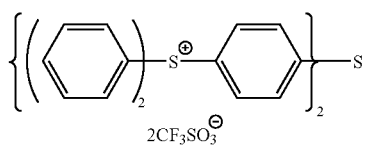
(PAG4-27) 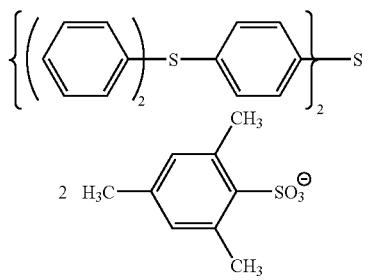
(PAG4-28) 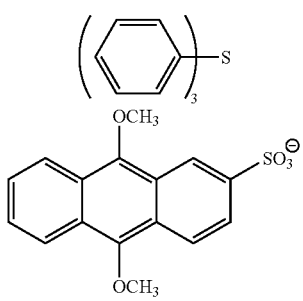
(PAG4-29) 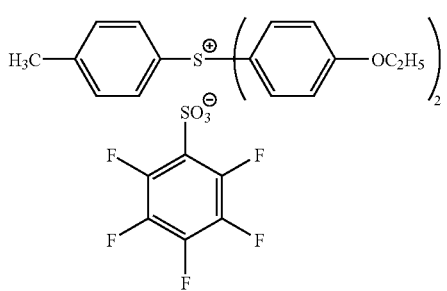
(PAG4-30) 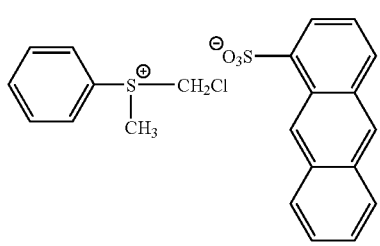
-continued
(PAG4-31) 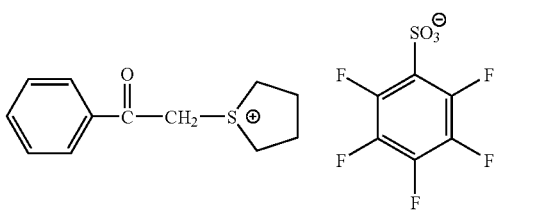
(PAG4-32) 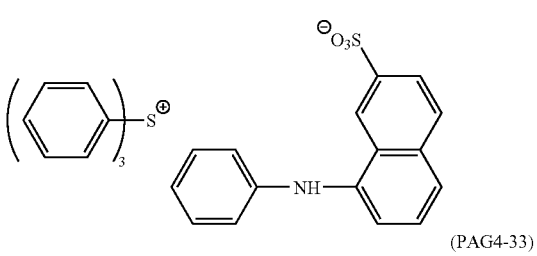
(PAG4-33) 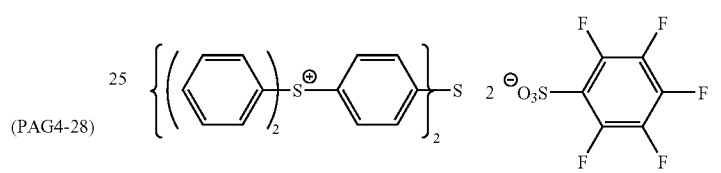
(PAG4-34) 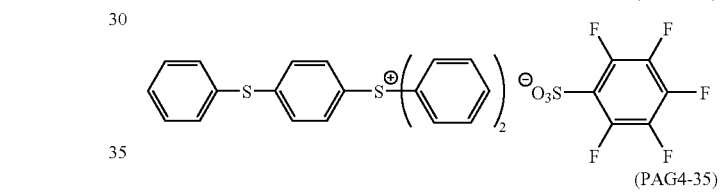
(PAG4-35) 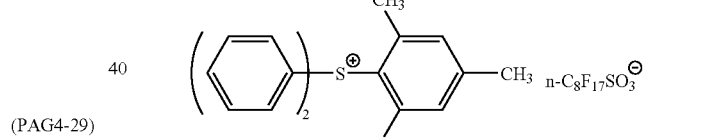
(PAG4-36) 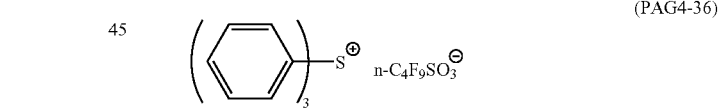
PAG4-37 
The above-mentioned onium salts represented by the general formulae (PAG3), (PAG4) are known, and can be synthesized by methods described, for example, in J. W. Knapczyketal, J. Am. Chem. Soc., 91, 145 (1969), A. L. Maycoketal, J. Org. Chem., 35, 2532, (1970), E. Goethasetal, Bull. Soc. Chem. Belg., 73, 546, (1964), H. M. Leicester, J. Ame. Chem. Soc., 51, 3587 (1929), J. V. Crivelloet al, J. Polym. Chem. Ed., 18, 2677 (1980), U.S. Pat. Nos. 2,807,648 and 4,247,473, Japanese Patent Application Laid-Open (JP-A) No. 53-101,331, and the like.

Further, the following compounds are mentioned as preferable thermal acid generators.

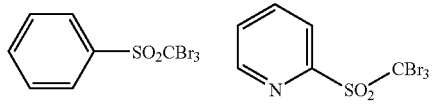

As the disulfone derivatives and imidesulfonate derivatives, preferably mentioned are disulfone derivatives represented by the following general formula (PAG5) and imidesulfonate derivatives represented by the general formula (PAG6).

(PAG5)

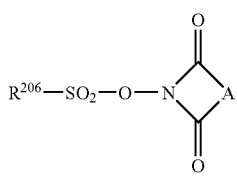
(PAG6)

In the formulae, $Ar^3$, $Ar^4$ represent each independently a substituted or unsubstituted aryl group. $R^{206}$ represents a substituted or unsubstituted alkyl group, or substituted or unsubstituted aryl group. A represents a substituted or unsubstituted alkylene group, substituted or unsubstituted alkenylene group, or substituted or unsubstituted arylene group.

Preferable examples of substituents on the above-mentioned groups include a hydroxyl group; alkoxy groups such as for example a methoxy group, ethoxy group, propoxy group, butoxy group and the like; halogen atoms such as for example chlorine, bromine, fluorine and the like; cyano group; dialkylamino groups such as for example a dimethylamino group, diethylamino group and the like; silyl group; substituted silyl groups such as for example a trimethylsilyl group, triethylsilyl group, t-butyldimethylsilyl group, triphenylsilyl group and the like, siloxy groups such as for example a t-butyldimethylsiloxy group and the like; sulfonate group, alkylcarbonyloxy group, alkylamide group, alkylsulfoneamide group, alkoxycarbonyl group, alkylamino group, alkylcarbamoyl group, alkylsulfamoyl group, alkoxy group, aryloxy group, aryloxycarbonyl group, alkylthio group, arylthio group, alkyl group, aryl group, carboxyl group, halogen atom (e.g., a chlorine atom, bromine atom, fluorine atom and the like), trifluoroacetyl group, cyano group, acyl group (e.g., an acetyl group, propionyl group, trifluoroacetyl group), acyloxy group (e.g., an acetoxy group, propionyloxy group, trifluoroacetoxy group and the like), alkylsulfonyl group, aryl sulfonyl group, cyano group, nitro group and the like.

Specific examples thereof include, but not limited to, the following compounds.

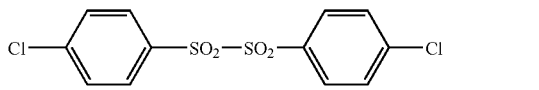
(PAG5-1)

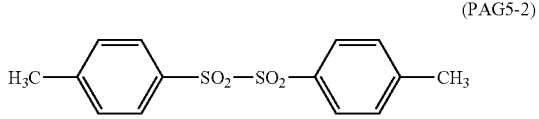
(PAG5-2)

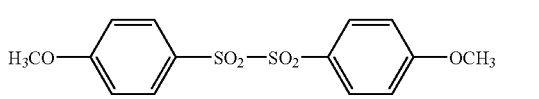
(PAG5-3)

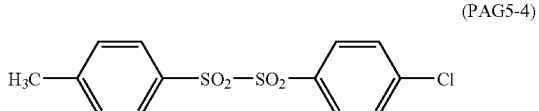
(PAG5-4)

(PAG5-5)

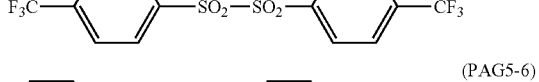
(PAG5-6)

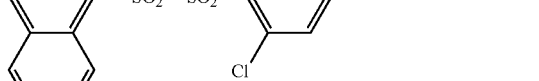
(PAG5-7)

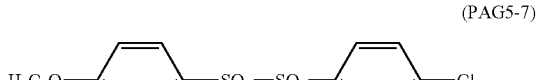
(PAG5-8)

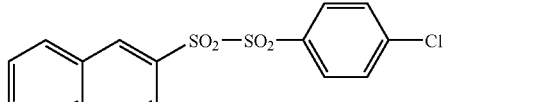
(PAG5-9)

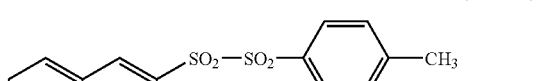
(PAG5-10)

-continued
(PAG5-11)
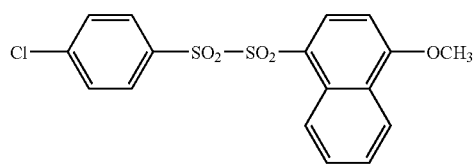
(PAG5-12)
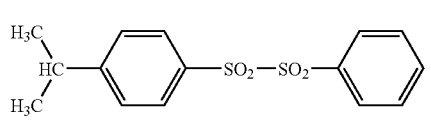
(PAG5-13)
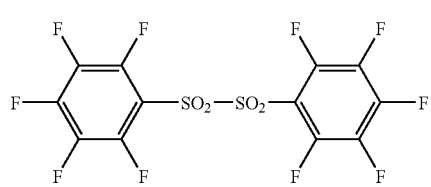
(PAG5-14)
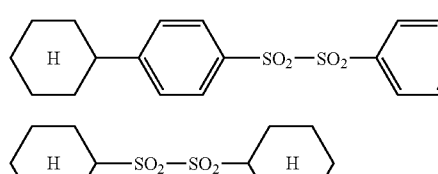
(PAG5-15)
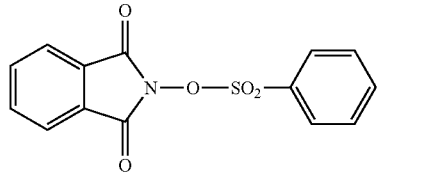
(PAG6-1)
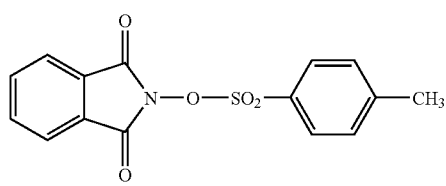
(PAG6-2)
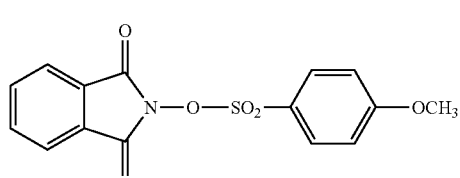
(PAG6-3)
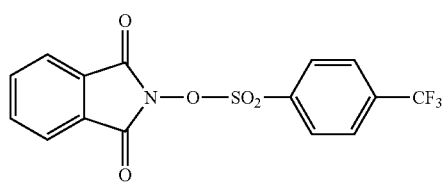
-continued
(PAG6-5)
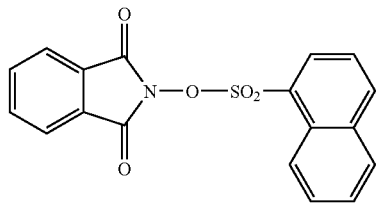
(PAG6-6)
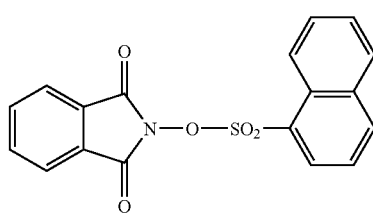
(PAG6-7)
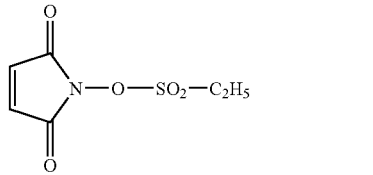
(PAG6-8)
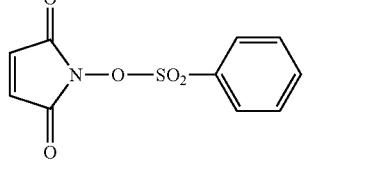
(PAG6-9)
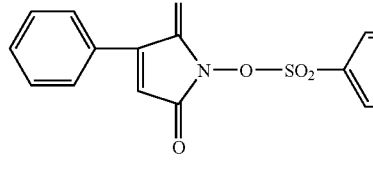
(PAG6-10)
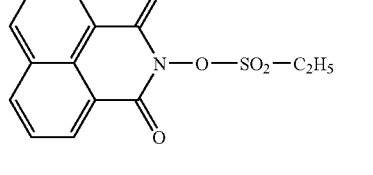
(PAG6-11)
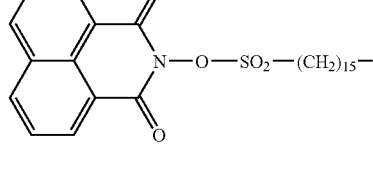
(PAG6-12)
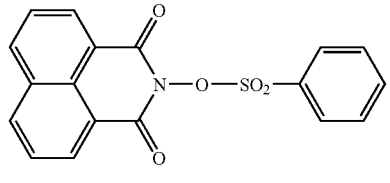
(PAG6-4)

-continued (PAG6-13)
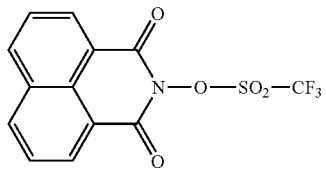

(PAG6-14)
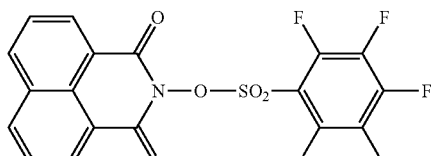

(PAG6-15)
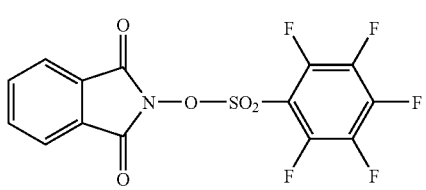

(PAG6-16)
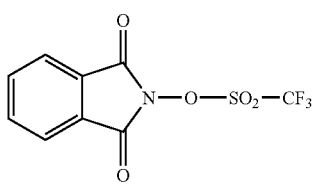

(PAG6-17)
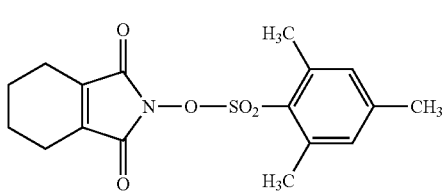

(PAG6-18)
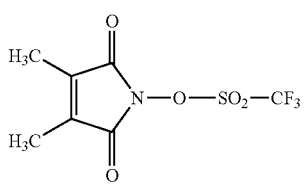

(PAG6-19)
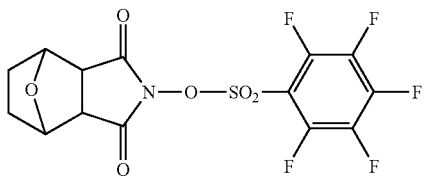

(PAG6-20)
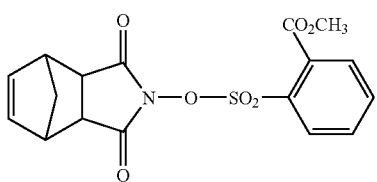

As the diazodisulfone derivatives, preferably mentioned are diazodisulfone derivatives represented by the following general formula (PAG7).

(PAG7)
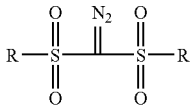

Here, R represents a linear, branched or cyclic alkyl group, or an aryl group optionally substituted. Specific examples thereof include, but not limited to, the following compounds.

(PAG7-1)
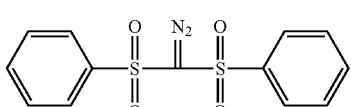

(PAG7-2)
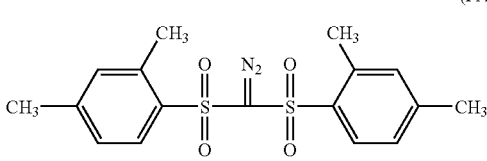

(PAG7-3)
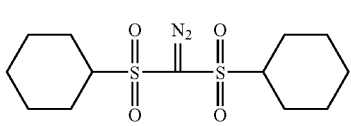

(PAG7-4)
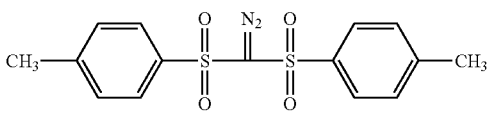

(PAG7-5)
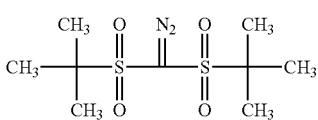

As the sulfonate derivative, further, compounds of the following formula (I) are preferably mentioned.

(I)
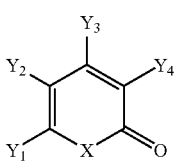

In the formula (I), $Y_1$ to $Y_4$ represent each independently a hydrogen atom, alkyl group, aryl group, halogen atom, alkoxyl group or group having —$OSO_2R$. At least one of $Y_1$ to $Y_4$ is a group having —$OSO_2R$. At least two of $Y_1$ to $Y_4$ may be mutually connected to form a ring structure. R represents an alkyl group, aryl group or camphor residue. The alkyl group represented by $Y_1$ to $Y_4$ is preferably an alkyl group having 1 to 30 carbon atoms, and examples thereof include linear or branched alkyl groups such as a methyl group, ethyl group, propyl group, n-butyl group, sec-butyl group, tert-butyl group and the like; and cyclic alkyl groups such as a cyclopropyl group, cyclopentyl group, cyclohexyl group, adamantly group, norbornyl group, boronyl group and the like, and these groups may have further a substituent. The aryl group represented by $Y_1$ to $Y_4$ is preferably an aryl group having 6 to 14 carbon atoms, and examples thereof include a phenyl group, tolyl group, naphthyl group and the like, and these groups may have further a substituent.

As the halogen atom represented by $Y_1$ to $Y_4$, for example, a chlorine atom, bromine atom, fluorine atom, iodine atom and the like are mentioned. As the alkoxyl group represented by $Y_1$ to $Y_4$, for example, preferably mentioned are alkoxyl groups having 1 to 5 carbon atoms, for example, a methoxy group, ethoxy group, propoxy group, butoxy group and the like. These groups may have further a substituent. At least two of $Y_1$ to $Y_4$ may be mutually connected to form a ring structure, and it is preferable that adjacent two groups form an aromatic ring. This ring may contain a hetero atom, or oxo group. The ring may further be substituted. The group having $-OSO_2R$ represented by $Y_1$ to $Y_4$ means a group represented by $-OSO_2R$ itself, or an organic group having a group represented by $-OSO_2R$ as a substituent. As the organic group having $-OSO_2R$ as a substituent, for example, groups containing substitution of $-OSO_2R$ on an alkyl group, aryl group or alkoxyl group as $Y_1$ to $Y_4$ are mentioned.

The alkyl group represented by R is preferably an alkyl group having 1 to 30 carbon atoms, and examples thereof include linear or branched alkyl groups such as a methyl group, ethyl group, propyl group, n-butyl group, sec-butyl group, tert-butyl group and the like; and cyclic alkyl groups such as a cyclopropyl group, cyclopentyl group, cyclohexyl group, adamantly group, norbornyl group, boronyl group and the like, and these groups may have further a substituent. The aryl group represented by R is preferably an aryl group having 6 to 14 carbon atoms, and examples thereof include a phenyl group, tolyl group, naphthyl group and the like, and these groups may have further a substituent.

X represents $-O-$, $-S-$, $-NH-$, $-NR_{61}-$ or $-CH_n(R_{61})_m-$. Here, $R_{61}$ represents an alkyl group, and m, n represent 0, 1 or 2, providing m+n=2. $R_{61}$ represents preferably an alkyl group having 1 to 30 carbon atoms, and examples thereof include linear or branched alkyl groups such as a methyl group, ethyl group, propyl group, n-butyl group, sec-butyl group, t-butyl group and the like, and cyclic alkyl groups such as a cyclopropyl group, cyclopentyl group, cyclohexyl group, adamantly group, norbornyl group, boronyl group and the like, and these groups may have further a substituent.

It is preferable that $Y_1$ and $Y_2$ are mutually connected to give a structure as represented by the following formula (II).

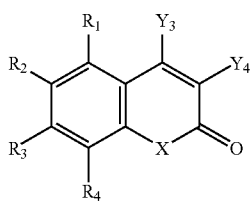

(II)

X in the above-mentioned formula (II), X represents $-O-$, $-S-$, $-NH-$, $-NR_{61}-$ or $-CH_n(R_{61})_m-$. $Y_3$ and $Y_4$ represent each independently a hydrogen atom, alkyl group, aryl group, halogen atom, alkoy group or group having $-OSO_2R$. Here, R represents an alkyl group, aryl group or camphor residue. $R_{61}$ represents an alkyl group, and m, n represent 0, 1 or 2, providing m+n=2. $R_1$ to $R_4$ represent each independently a hydrogen atom, alkyl group, alkoxyl group, halogen atom, hydroxyl group, nitro group, cyano group, aryl group, aryloxy group, alkoxycarbonyl group, acyl group, acyloxy group or group having $-OSO_2R$.

Here, at least one of $R_1$ to $R_4$, $Y_3$ and $Y_4$ is a group having $-OSO_2R$. It is preferable that $Y_3$ is a group having $-OSO_2R$.

Therefore, among compounds of the above-mentioned formula (I), further preferable are compounds of the following formula (III) and more preferable are compounds of the following formula (IV).

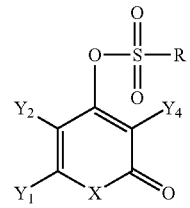

(III)

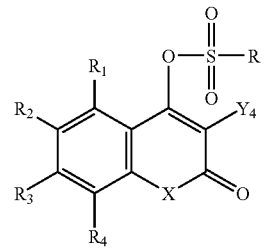

(IV)

In the formulae (III) and (IV), $Y_1$, $Y_2$, $Y_4$, R and X are as defined for the formula (I) and (II). $R_1$ to $R_4$ represent a hydrogen atom, alkyl group, alkoxyl group, halogen atom, hydroxyl group, nitro group, cyano group, aryl group, aryloxy group, alkoxycarbonyl group, acyl group, acyloxy group or group having $-OSO_2R$. The alkyl group represented by $R_1$ to $R_4$ is preferably an alkyl group having 1 to 30 carbon atoms, and examples thereof include linear or branched alkyl groups such as a methyl group, ethyl group, propyl group, n-butyl group, sec-butyl group, tert-butyl group and the like; and cyclic alkyl groups such as a cyclopropyl group, cyclopentyl group, cyclohexyl group, adamantyl group, norbornyl group, boronyl group and the like, and these groups may have further a substituent. The aryl group represented by $R_1$ to $R_4$ is preferably an aryl group having 6 to 14 carbon atoms, and examples thereof include a phenyl group, tolyl group, naphthyl group and the like, and these groups may have further a substituent.

As the halogen atom represented by $R_1$ to $R_4$, for example, a chlorine atom, bromine atom, fluorine atom, iodine atom and the like are mentioned. As the alkoxyl group represented by $R_1$ to $R_4$, for example, preferably mentioned are alkoxyl groups having 1 to 5 carbon atoms, for example, a methoxy group, ethoxy group, propoxy group, butoxy group and the like. These groups may have further a substituent.

The group having $-OSO_2R$ represented by $R_1$ to $R_4$ means a group represented by $-OSO_2R$ itself, or an organic group having a group represented by $-OSO_2R$ as a substituent. As the organic group having $-OSO_2R$ as a substituent, mentioned are, for example, alkyl groups, alkoxyl groups, hydroxyl group, nitro group, cyano group, aryl groups, aryloxy groups, alkoxycarbonyl groups, acyl group or groups having $-OSO_2R$ on an acyloxy group, as $R_1$ to $R_4$. At least two of $R_1$ to $R_4$ may be mutually connected to form a ring structure.

When $Y_1$ to $Y_4$, R, X, $R_1$ to $R_4$ have further a substituent, a substituent such as, for example, an aryl group (e.g., phenyl group), nitro group, halogen atom, carboxyl group, hydroxyl group, amino group, cyano group, alkoxyl group (preferably, having 1 to 5 carbon atoms) and the like can be carried. For the aryl group and the arylene group, alkyl groups (preferably, having 1 to 5 carbon atoms) are further mentioned.
Specific preferable examples of the compound of the formula (I) include, but not limited to, the following compounds.
(I-1)
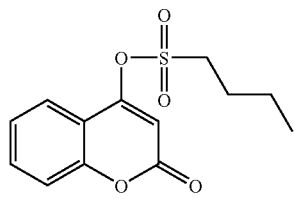
(I-2)
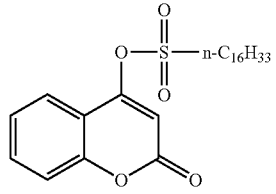
(I-3)
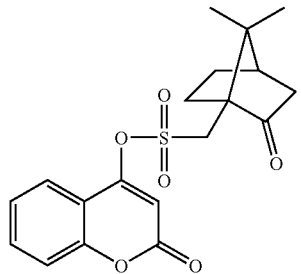
(I-4)
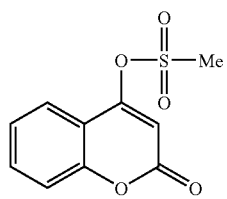
(I-5)
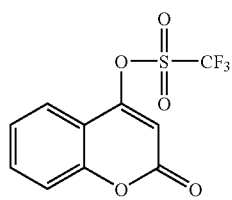
(I-6)
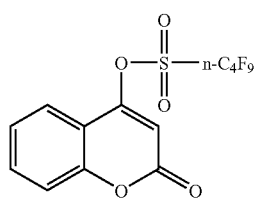
(I-7)
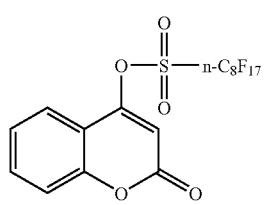
-continued
(I-8)
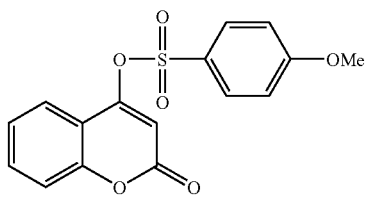
(I-9)
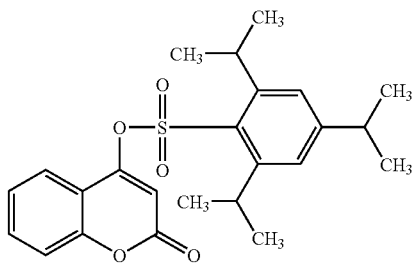
(I-10)
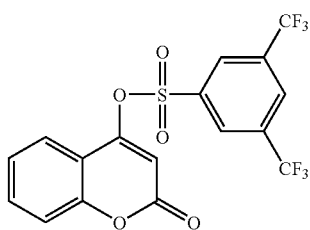
(I-11)
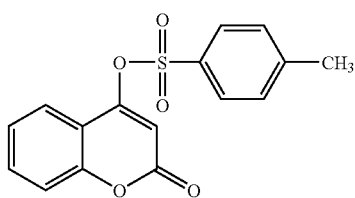
(I-12)
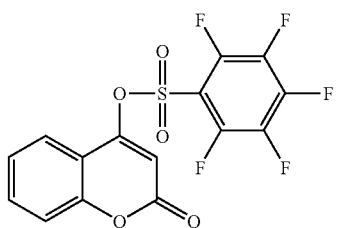
(I-13)
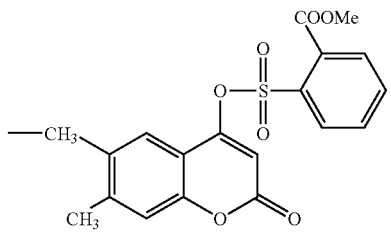
(I-14)
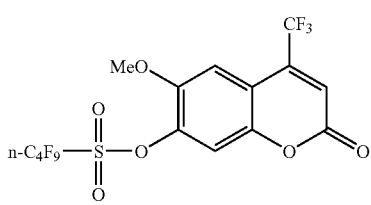

-continued (I-15)
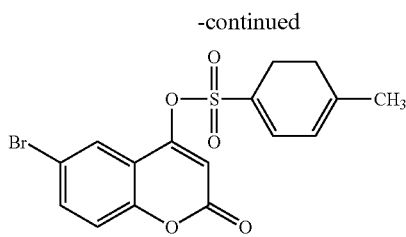

(I-16)
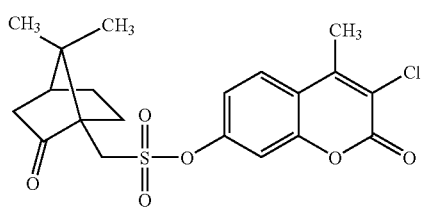

(I-17)
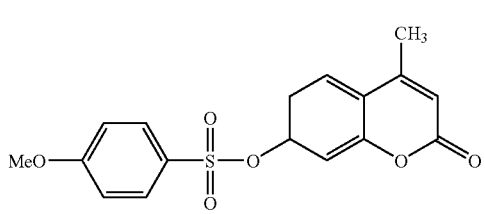

(I-18)
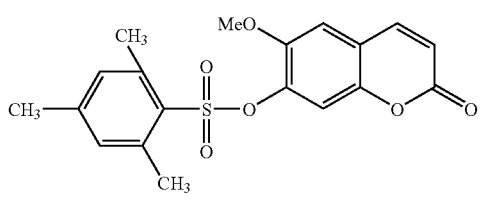

(I-19)
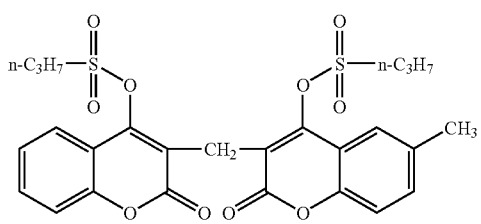

(I-20)
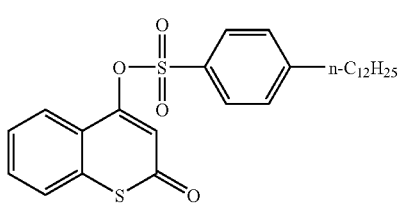

(I-21)
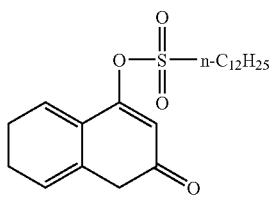

-continued (I-22)
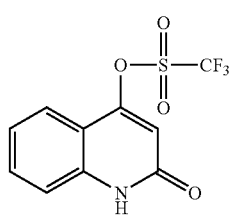

(I-23)
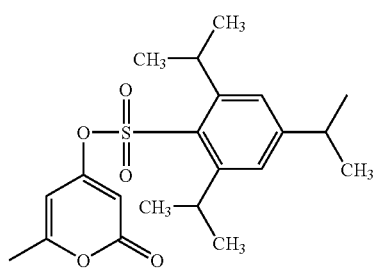

(I-24)
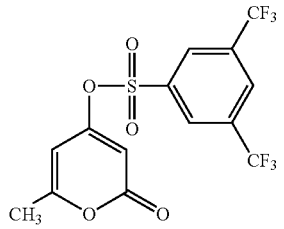

(I-25)
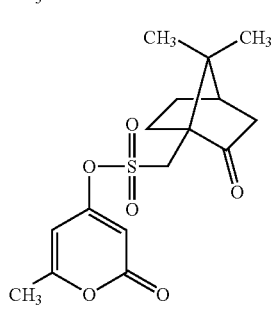

(I-26)
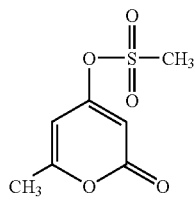

(I-27)
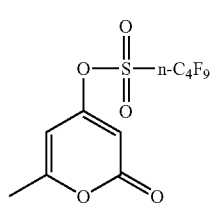

The photoacid generators represented by the formula (I) can be used singly or in combination of two or more.

Further, particularly preferable as the photoacid generator are bis(4-tert-butylphenyl)iodonium p-toluene sulfonato, 4-methoxyphenyl-phenyliodonium camphor sulfonato, bis (4-tert-butylphenyl)iodonium camphor sulfonato, diphenyliodonium p-toluene sulfonato, bis(4-tert-butylphenyl)iodonium perfluorobutyl sulfonato, bis(4-tert-butylphenyl)

iodonium cyclohexyl sulfamate, succinimidyl p-toluene sulfonato, naphthalimidyl camphor sulfonato, 2-[(tribromomethyl)sulfonyl]pyridine, tribromomethyl phenyl sulfone and the like. These compounds can be used singly or, if necessary, in combination of two or more.

The content of a thermal acid generator as the component (C) in a positive resist composition of the present invention can be preferably 0.5 to 20 wt %, more preferably 1 to 15 wt % based on the total amount of the components (A), (B) and (C).

The kind of the thermal acid generator and its compounding amount are also selected so that the generator itself, or in combination with components (A) and (B), gives a property as a desired positive resist, and it is preferable that the kind and the composition are so set that, for example, an exposure treatment in a complete bright room such as under a white light and the like is possible, desired sensitivity and resolution are obtained at the strength of laser lights in the near infrared region used for exposure, further, a baking treatment is unnecessary in forming a coated film and a layer.

In the positive resist composition of the present invention, an acid can also be added in addition to the above-mentioned components (A) to (C). By adding this acid in suitable amount, properties such as photosensitivity and the like can be improved by a synergistic action with the thermal acid generator, and resolution and sensitivity and the like can be further improved. As the acid which can be used for such a purpose, mentioned are inorganic acids such as hydrochloric acid, nitric acid, sulfuric acid, phosphoric acid and the like, and organic acids such as carboxylic acids such as acetic acid, oxalic acid, tartaric acid, benzoic acid and the like, sulfonic acid, sulfinic acid, phenols, imides, oximes, aromatic sulfoneamides, and the like, one or more acids selected from these acids can be added according to the purpose. Of them, p-toluenesulfonic acid is particularly preferable. The acid can be selected in a range of preferably 0.001 to 1 mol, more preferably 0.05 to 0.5 mol based on 1 mol of a thermal acid generator, and used.

Further, in the positive resist composition of the present invention, one or more compounds selected from close adherence improvers, metal chelate preventing agents, surface adjusting agents and the like can be added according to the intended application, in addition to the above-mentioned components. Further, a UV absorber may also be added for preventing decomposition of an acid generator in a bright room. Examples of preferable UV absorbers include hydroxyphenylbenzophenone, oxalic anilide, hydroxyphenyltriazine, Tinuvin 1130 (manufactured by Chiba Specialty Chemicals) and the like. The addition amount can be preferably 0.1 to 50 parts by weight, more preferably 1 to 30 parts by weight.

The positive resist composition of the present invention may also be a liquid composition by adding a solvent. Examples of the solvent include water, hydrocarbon-based solvents such as hexane, toluene, xylene and the like, ether-based solvents such as dioxane, tetrahydrofuran and the like, ketone-based solvents such as acetone, methyl ethyl ketone, methyl isobutyl ketone and the like, acetate-based solvents such as ethyl acetate, propylene glycol methyl ether acetate, and the like, and these compounds can be used singly or in combination of two or more according to the application of a positive resist composition of the present invention. The solvent can be used in an amount so that the solid content is preferably 1 to 50 wt %, more preferably 2 to 20 wt %, in an application, for example, of film formation by coating. Depending on the kind of the solvent, a component for retaining liquid condition may be added. For example, a liquid composition can be obtained by inclusion of components necessary for water or a solvent mainly composed of water, using an emulsifier.

A positive resist composition of the present invention is made liquid using the solvent as described above, coated on a base plate to form a film, this is irradiated with a laser light having a wavelength in the near infrared region at positions according to a give pattern, and this is developed, thus, a given resist pattern can be obtained. In this case, the positive resist composition of the present invention can also be a composition in which conditions for a baking treatment by heating are relaxed or the baking treatment is unnecessary in film formation. For example, when a film or layer of a positive resist composition is formed by various coating methods on the surface of a base plate in the form of continuous sheet and this is heated by a heating roller to perform a baking treatment, if the width of the base plate increases, the width of the heating roller is also required to be increased. Thus, the size of a heating apparatus increases, and additionally, heat capacity also increases, leading to a necessity of further apparatuses for controlling heating and cooling. In contrast, by relaxing baking treatment conditions or omitting a baking treatment, these apparatuses can be omitted and production efficiency of an original plate carrying a film or layer of a positive resist composition can be improved.

The base plate on which a positive resist composition of the present invention is film-formed to give a photosensitive layer in the near infrared ray is variously selected depending on the intended application, and may also be that on which various surface treatments have been carried out for film formation depending on a necessity of a hydrophilization treatment and the like. As constituent materials of such a base plate, mentioned are metals such as copper, aluminum, iron and the like, and various resins such as polyethylene terephthalate, and the like. In formation of a printing plate, for example, in formation of a photosensitive layer on a gravure printing plate, offset printing plate, flexographic printing plate and the like, particularly, on a gravure printing plate, a positive resist composition of the present invention can be suitably used.

As the method for forming a photosensitive layer using a positive resist composition of the present invention on a base plate, mentioned are a method in which a liquid composition is coated in given amount so as to obtain desired layer thickness after drying on a base plate and a solvent is vaporized to obtain a photosensitive layer, a method in which a composition is coated on a base plate for dry film formation to give a dry film and this is laminated on a base plate on which a photosensitive layer is to be formed, and the like. For coating on a base plate, a spin coat method, blade coat method, spray coat method, wire bar coat method, dipping method, air knife coat method, roller coat method, curtain coat method and the like can be used. This thickness of a photosensitive layer is set depending on the intended application, and can be selected, for example, in a range of 0.5 to 5 µm.

Irradiation of a photosensitive layer provided on a base plate with a light in the near infrared region can be carried out by a laser apparatus which can perform irradiation with a light, for example, in a wavelength range of 700 to 2000 nm, preferably 800 to 1600 nm, as described above. The laser apparatus may be selected from solid lasers such as ruby laser, YAG (yttrium aluminum garnet) laser and the like and various semiconductor lasers and the like and not particularly restricted, and preferable are semiconductor lasers of which miniaturization is possible, particularly, semiconductor lasers in the near infrared region containing a wavelength of 830 nm from the standpoint of output and the like. As the output of the irradiation apparatus, used are outputs for obtaining desired sensitivity based on the composition and layer thickness of a photosensitive layer and the like, for example, outputs for obtaining effective resolution in treatment in a bright room, and high output lasers up to about 20 W can also be used.

The strength of a light source for irradiation can be $2.0 \times 10^6$ mJ/s·cm$^2$ or more, preferably $1.0 \times 10^7$ mJ/s·cm$^2$ or more.

As the developer for removing an exposed portion from on a base plate after exposure, an alkali developer can be used which can dissolve a portion on which an acid has acted on a constitutional unit having a polymerizable ethylenically unsaturated bond and an alkali-soluble group. As the alkali component to be used in the developer, mentioned are, for example, inorganic alkali salts such as sodium silicate, potassium silicate, lithium silicate, ammonium silicate, sodium metasilicate, potassium metasilicate, sodium hydroxide, potassium hydroxide, lithium hydroxide, sodium carbonate, sodium bicarbonate, potassium carbonate, dibasic sodium phosphate, tribasic sodium phosphate, dibasic ammonium phosphate, tribasic ammonium phosphate, sodium borate, potassium borate, ammonium borate and the like, and organic amine compounds such as monomethylamine, dimethylamine, trimethylamine, monoethylamine, diethylamine, triethylamine, monoisopropylamine, diisopropylamine, monobutylamine, monoethanolamine, diethanolamine, triethanolamine, monoisopropanolamine, diisopropanolamine and the like. Of them, silicates of alkali metals such as sodium metasilicate and the like are preferable. In the developer, various surfactants (anionic surfactants, nonionic surfactants, ampholytic surfactants) and organic solvents such as alcohol and the like can be added, if necessary. The content of the alkali component can be selected depending on the composition of a positive resist composition and the like, and for example, can be about 0.1 to 5 wt %.

EXAMPLES

The weight-average molecular weights (Mw) of polymers in Reference Examples A-3, A-4 and B-2 were measured by gel permeation chromatography under the following conditions.

Column: TSKgel Super HM-M (two) and HM-H (one) [all are manufactured by Tosoh Corporation] were connected serially.

Column retention temperature: 40° C.

Detector: RI

Developing solvent: tetrahydrofuran (flow rate: 0.5 ml/min)

Standard substance: polystyrene

Irradiation of a photosensitive layer with laser in examples was carried out under the following conditions.

Number of beams: 208

Resolution: 3200 dpi

Laser output (total): 17 W

Laser wavelength for drawing: 830 nm

Laser scanning speed: 2000 mm/second

[Reference Example of Production Method of Polymers (P-1 and P-2) and Raw Materials Thereof]

Reference Example A-1

Synthesis of Monomer 51 g of methacrylic acid, 75 g of 1-methoxy-2-methylpropene and 0.05 g of p-toluenesulfonic acid monohydrate were added and reacted at room temperature for 2.5 hours. In this procedure, the conversion of methacrylic acid was 90% or more, and the selectivity to 1-methoxy-2-methylpropyl methacrylate was 99% or more. The reaction liquid was neutralized with a 5 wt % sodium carbonate aqueous solution, then, the liquid was separated to obtain an organic layer which was concentrated under reduced pressure, to obtain 81 g of 1-methoxy-2-methylpropyl methacrylate.

$^1$H-NMR spectrum of the intended substance is described below. $^1$H-NMR spectrum (400 MHz) Measuring apparatus: JEOL Ltd. GSX-400 Measuring solvent: heavy chloroform d:6.19-6.17 (m, 1H), 5.62-5.60 (m, 2H), 3.42 (s, 3H), 1.99-1.96 (m, 4H), 0.96 (d, J=6.8 Hz, 3H), 0.95 (d, J=6.8 Hz, 3H)

Reference Example A-2

Synthesis of Monomer 86 g of methacrylic acid, 100 g of 1-ethoxybutene and 0.2 g of phosphoric acid were added and reacted at room temperature for 3 hours. The conversion of methacrylic acid was 80%, and the selectivity to 1-ethoxybutyl methacrylate was 95%. The reaction liquid was neutralized with a 5 wt % sodium carbonate aqueous solution, then, the liquid was separated to obtain an organic layer which was concentrated under reduced pressure, to obtain 138 g of 1-ethoxybutyl methacrylate $^1$H-NMR spectrum of the intended substance is described below. $^1$H-NMR spectrum (400 MHz) Measuring apparatus: JEOL Ltd. GSX-400 Measuring solvent: heavy chloroform d:6.17-6.15 (m, 1H), 5.91 (t, J=5.6 Hz, 1H), 5.60-5.58 (m, 1H), 3.73 (dq, J=9.6, 7.1 Hz, 1H), 3.56 (dq, J=9.6, 7.1 Hz, 1H), 1.96-1.95 (m, 3H), 1.74-1.67 (m, 2H), 1.45-1.38 (m, 2H), 1.21 (t, J=7.1 Hz, 3H), 0.94 (t, J=7.3 Hz, 3H)

Reference Example A-3

Production of Vinyl-Based Polymer (P-1)

Into a flask equipped with a dropping apparatus, stirrer, thermometer, cooling tube and nitrogen gas introduction tube was charged 200.0 g of cyclohexanone which was heated up to 80° C., and a solution obtained by uniformly dissolving 40 g of 1-methoxy-2-methylpropyl methacrylate, 160 g of butyl methacrylate and 16 g of 2,2'-azobis-2-methylbutyronitrile (AMBN) was dropped into this from the dropping apparatus over a period of 2 hours while stirring under a nitrogen atmosphere. After completion of dropping, a mixed solution of AMBN/propylene glycol monomethyl ether acetate=0.2 g/1.8 g was added three times every 30 minutes and aged for 3.5 hours at 80° C., to complete the polymerization reaction. The resultant polymer solution had a solid content of 52 wt % (measured by change in weight before and after drying at 105° C. for 3 hours), and a vinyl-based polymer (P-1) having a weight-average molecular weight of 16100 was obtained.

Reference Example A-4

Production of Vinyl-Based Polymer (P-2)

Using the same apparatus as in Reference Example A-3, 200 g of propylene glycol monomethyl ether acetate was charged and heated up to 80° C., and a solution obtained by uniformly dissolving 40 g of 1-ethoxybutyl methacrylate, 140 g of butyl methacrylate, 20 g of hydroxylethyl methacrylate and 14 g of azobisisobutyronitrile (AIBN) was dropped into this from the dropping apparatus over a period of 2 hours while stirring under a nitrogen atmosphere. After completion of dropping, a mixed solution of AIBN/propylene glycol monomethyl ether acetate=0.2 g/1.8 g was added three times every 30 minutes and aged for 3.5 hours at 80° C., to complete the polymerization reaction. The resultant polymer solution had a solid content of 51 wt %, and a vinyl-based polymer (P-2) having a weight-average molecular weight of 26500 was obtained.

Example A-1

100 parts by weight of a vinyl-based polymer (P-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

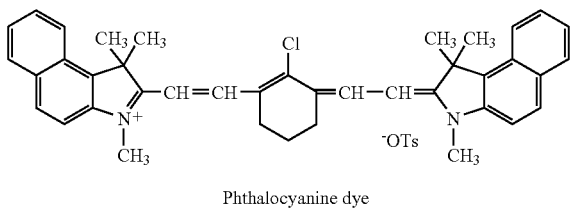

Phthalocyanine dye

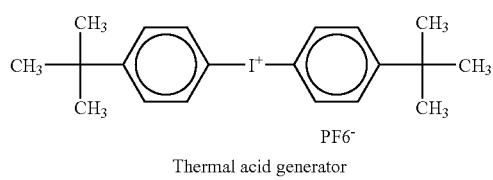

PF6−
Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-2

A liquid composition was prepared in the same manner as in Example A-1 excepting that a vinyl-based polymer (P-2) was used instead of (P-1), and a photosensitive layer formed using this composition was evaluated. As a result, a resist resolution of a width of 5 μm between adjacent beam spot irradiated sites was confirmed.

Example A-3

100 parts by weight of a vinyl-based polymer (P-1), 20 parts by weight of a phthalocyanine dye described below and 10 parts by weight of a thermal acid generator described below were added into methyl ethyl ketone so that the solid content thereof was 20 wt %, to obtain a liquid composition.

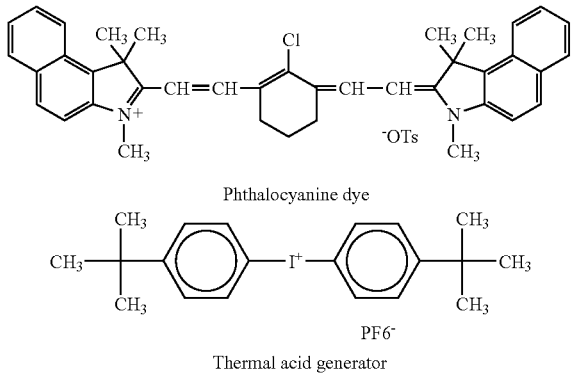

Phthalocyanine dye

PF6−
Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-4

100 parts by weight of a vinyl-based polymer (P-1), 20 parts by weight of a phthalocyanine dye described below and 10 parts by weight of a thermal acid generator described below were added into methyl ethyl ketone so that the solid content thereof was 20 wt %, to obtain a liquid composition.

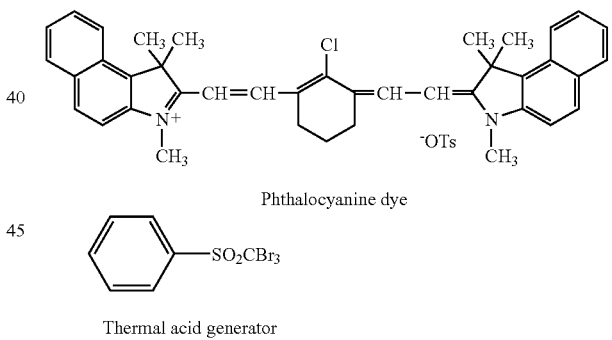

Phthalocyanine dye

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-5

100 parts by weight of a vinyl-based polymer (P-1), 20 parts by weight of a phthalocyanine dye described below and 10 parts by weight of a thermal acid generator described below were added into methyl ethyl ketone so that the solid content thereof was 20 wt %, to obtain a liquid composition.

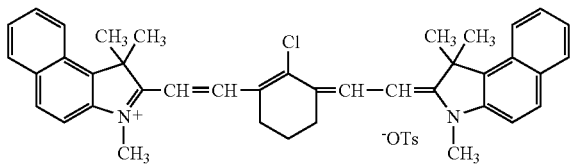

Phthalocyanine dye

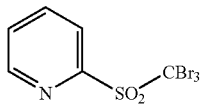

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 μm between adjacent beam spot irradiated sites was confirmed.

Example A-6

100 parts by weight of a vinyl-based polymer (P-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

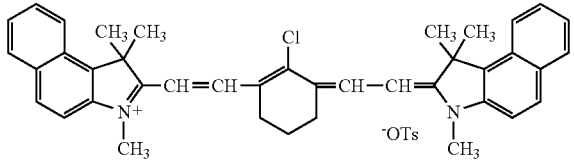

Phthalocyanine dye

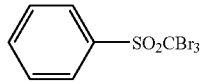

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 μm between adjacent beam spot irradiated sites was confirmed.

Example A-7

100 parts by weight of a vinyl-based polymer (P-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

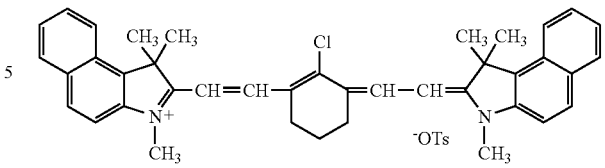

Phthalocyanine dye

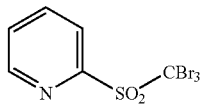

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 μm between adjacent beam spot irradiated sites was confirmed.

Example A-8

100 parts by weight of a vinyl-based polymer (P-1), 20 parts by weight of a dye described below and 10 parts by weight of a thermal acid generator described below were added into methyl ethyl ketone so that the solid content thereof was 20 wt %, to obtain a liquid composition.

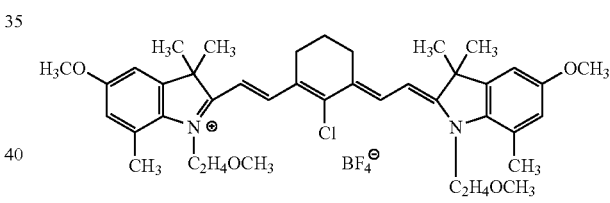

Dye

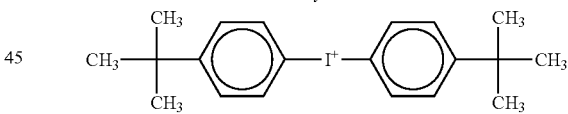

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$-aqueous-solution, washed and dried, then, the resulting resist pattern was evaluated. As a result, a resist resolution of a width of 5 μm between adjacent beam spot irradiated sites was confirmed.

Example A-9

100 parts by weight of a vinyl-based polymer (P-1), 20 parts by weight of a dye described below and 10 parts by weight of a thermal acid generator described below were added into methyl ethyl ketone so that the solid content thereof was 20 wt %, to obtain a liquid composition.

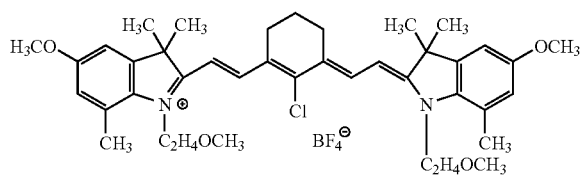

Dye

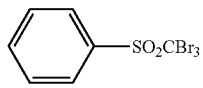

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-10

100 parts by weight of a vinyl-based polymer (P-1), 20 parts by weight of a dye described below and 10 parts by weight of a thermal acid generator described below were added into methyl ethyl ketone so that the solid content thereof was 20 wt %, to obtain a liquid composition.

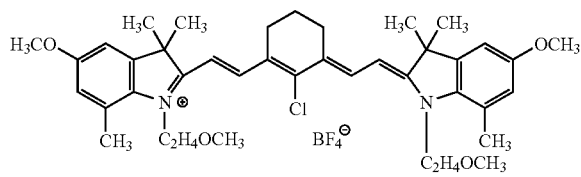

Dye

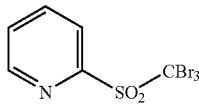

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-11

100 parts by weight of a vinyl-based polymer (P-1), 20 parts by weight of a dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

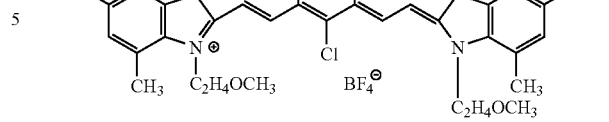

Dye

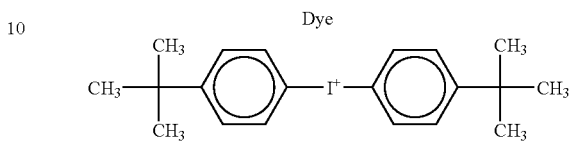

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-12

100 parts by weight of a vinyl-based polymer (P-1), 20 parts by weight of a dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

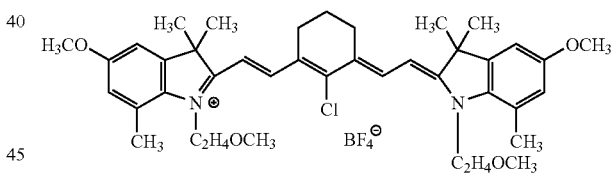

Dye

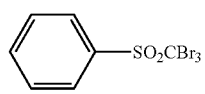

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-13

100 parts by weight of a vinyl-based polymer (P-1), 20 parts by weight of a dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

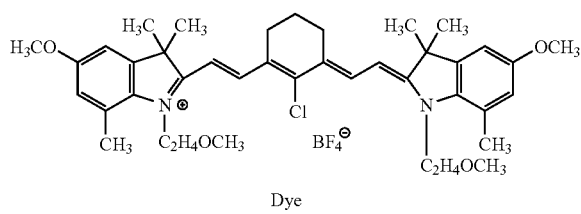

Dye

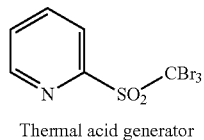

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example A-14

100 parts by weight of a vinyl-based polymer (P-1), 20 parts by weight of a dye described below, 10 parts by weight of a thermal acid generator described below, 0.5 parts by weight of p-toluenesulfonic acid and 1.5 parts by weight of a UV absorber were added into methyl ethyl ketone so that the solid content thereof was 20 wt %, to obtain a liquid composition.

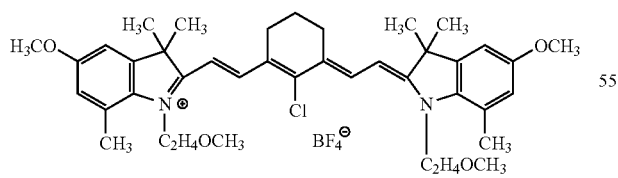

Dye

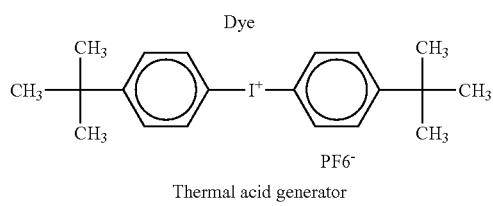

Thermal acid generator

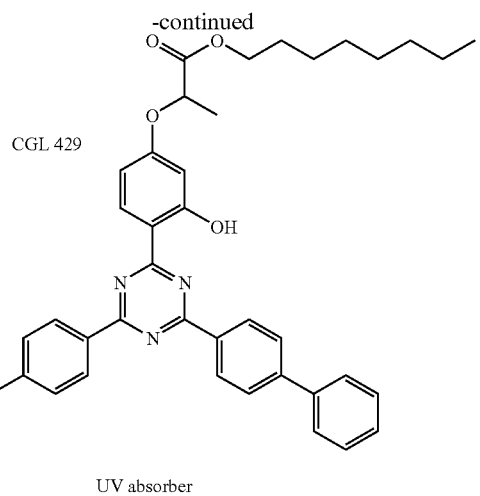

UV absorber

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

[Reference Example of Production Method of Polymer (Q-1) and Raw Materials Thereof]

Reference Example B-1

Synthesis of Monomer 50 g of methacrylic acid, 42 g of ethyl vinyl ether and 0.4 g of phosphoric acid were added and reacted at room temperature for 3 hours. The conversion of methacrylic acid was 82%, and the selectivity to 1-ethoxyethyl methacrylate was 85%. The reaction liquid was neutralized with a 5 wt % sodium carbonate aqueous solution, then, the liquid was separated to obtain an organic layer which was concentrated under reduced pressure, to obtain 74 g of 1-ethoxyethyl methacrylate.

$^1$H-NMR spectrum of the intended substance is described below. $^1$H-NMR spectrum (400 MHz) Measuring apparatus: JEOL Ltd. GSX-400 Measuring solvent: heavy chloroform d:6.16-6.14 (m, 1H), 6.00 (q, J=5.4 Hz, 1H), 5.60-5.59 (m, 1H), 3.73 (dq, J=9.5, 7.1 Hz, 1H), 3.56 (dq, J=9.6, 7.1 Hz, 1H), 1.95-1.94 (m, 3H), 1.44 (d, J=5.1 Hz, 3H), 1.22 (t, J=7.1 Hz, 3H)

Reference Example B-2

Production of Vinyl-Based Polymer (Q-1)

Into a flask equipped with a dropping apparatus, stirrer, thermometer, cooling tube and nitrogen gas introduction tube was charged 200.0 g of cyclohexanone which was heated up to 80° C., and a solution obtained by uniformly dissolving 40 g of 1-ethoxyethyl methacrylate, 160 g of butyl methacrylate and 16 g of 2,2'-azobis-2-methylbutyronitrile (AMBN) was dropped into this from the dropping apparatus over a period of 2 hours while stirring under a nitrogen atmosphere. After completion of dropping, a mixed solution of AMBN/propylene glycol monomethyl ether acetate=0.2 g/1.8 g was added three times every 30 minutes and aged for 3.5 hours at 80° C., to complete the polymerization reaction. The resultant polymer solution-had a solid content of 53 wt %, and a ylnyl-based polymer (Q-1) having a weight-average molecular weight of 13000 was obtained.

Reference Example B-1

100 parts by weight of a vinyl-based polymer (Q-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

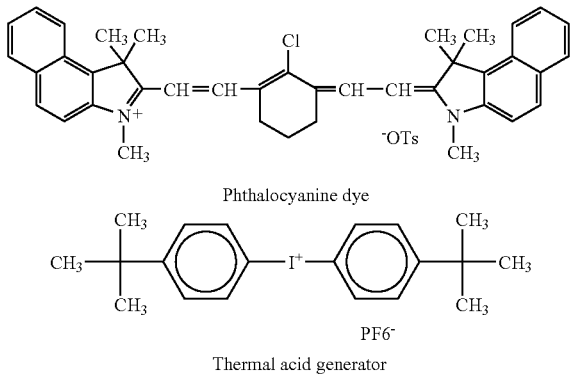

Phthalocyanine dye

Thermal acid generator

This liquid composition was coated on a copper base plate so that the film thickness after drying was 1.5 µm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 µm between adjacent beam spot irradiated sites was confirmed.

Example B-2

100 parts by weight of a vinyl-based polymer (Q-1), 20 parts by weight of a phthalocyanine dye described below and 10 parts by weight of a thermal acid generator described below were added into methyl ethyl ketone so that the solid content thereof was 20 wt %, to obtain a liquid composition.

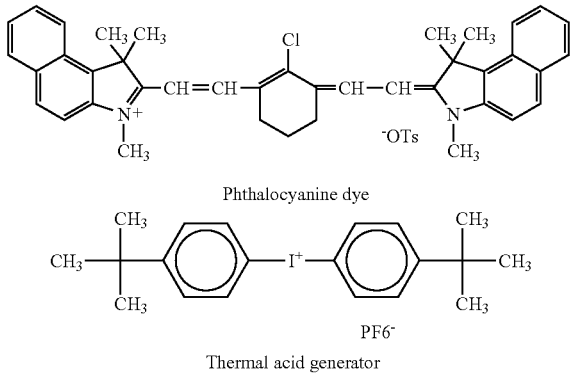

Phthalocyanine dye

Thermal acid generator

This liquid composition was coated on a copper base plate so that the film thickness after drying was 1.5 µm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 µm between adjacent beam spot irradiated sites was confirmed.

Example B-3

100 parts by weight of a vinyl-based polymer (Q-1), 20 parts by weight of a phthalocyanine dye described below and 10 parts by weight of a thermal acid generator described below were added into methyl ethyl ketone so that the solid content thereof was 20 wt %, to obtain a liquid composition.

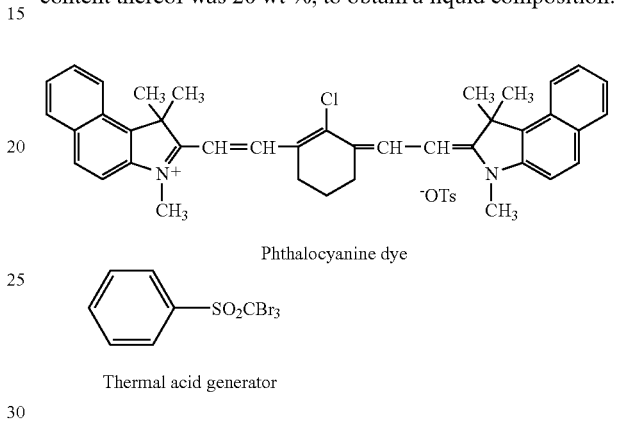

Phthalocyanine dye

Thermal acid generator

This liquid composition was coated on a copper base plate so that the film thickness after drying was 1.5 µm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 µm between adjacent beam spot irradiated sites was confirmed.

Example B-4

100 parts by weight of a vinyl-based polymer (Q-1), 20 parts by weight of a phthalocyanine dye described below and 10 parts by weight of a thermal acid generator described below were added into methyl ethyl ketone so that the solid content thereof was 20 wt %, to obtain a liquid composition.

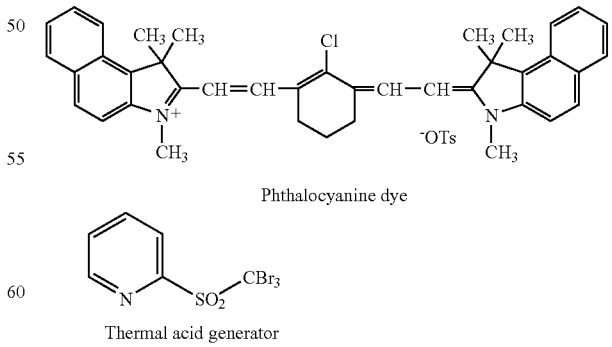

Phthalocyanine dye

Thermal acid generator

This liquid composition was coated on a copper base plate so that the film thickness after drying was 1.5 µm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-5

100 parts by weight of a vinyl-based polymer (Q-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

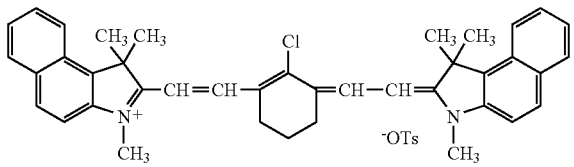

Phthalocyanine dye

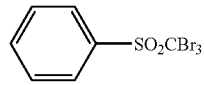

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-6

100 parts by weight of a vinyl-based polymer (Q-1), 20 parts by weight of a phthalocyanine dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

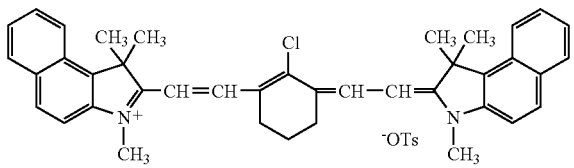

Phthalocyanine dye

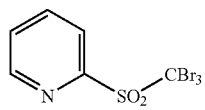

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-7

100 parts by weight of a vinyl-based polymer (Q-1), 20 parts by weight of a dye described below and 10 parts by weight of a thermal acid generator described below were added into methyl ethyl ketone so that the solid content thereof was 20 wt %, to obtain a liquid composition.

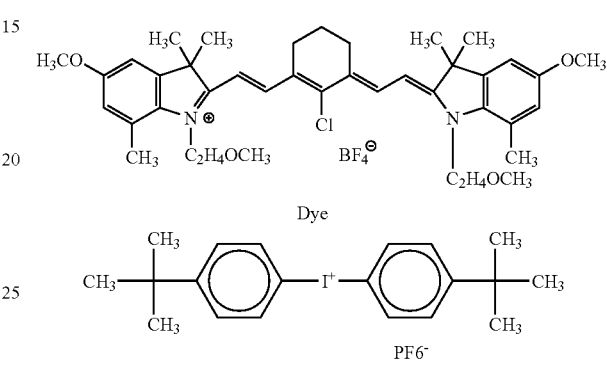

Dye

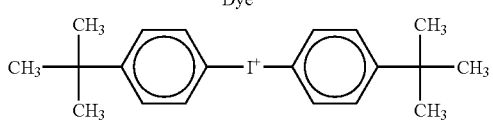

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam-spot irradiated sites was confirmed.

Example B-8

100 parts by weight of a vinyl-based polymer (Q-1), 20 parts by weight of a dye described below and 10 parts by weight of a thermal acid generator described below were added into methyl ethyl ketone so that the solid content thereof was 20 wt %, to obtain a liquid composition.

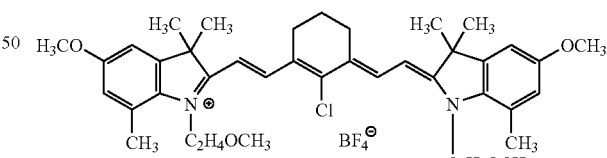

Dye

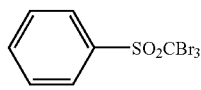

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-1

100 parts by weight of a vinyl-based polymer (Q-1), 20 parts by weight of a dye described below and 10 parts by weight of a thermal acid generator described below were added into methyl ethyl ketone so that the solid content thereof was 20 wt %, to obtain a liquid composition.

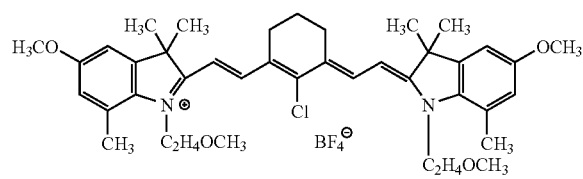

Dye

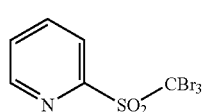

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-10

100 parts by weight of a vinyl-based polymer (Q-1), 20 parts by weight of a dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

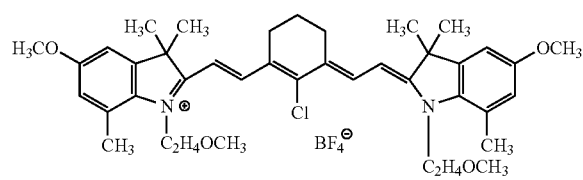

Dye

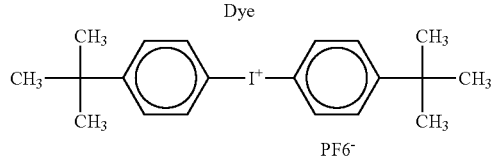

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-11

100 parts by weight of a vinyl-based polymer (Q-1), 20 parts by weight of a dye described below, 10 parts by weight of a thermal acid generator described below and 0.5 parts by weight of p-toluenesulforfic acid were added into methyl ethyl ketone so that the solid content thereof was 20 wt %, to obtain a liquid composition.

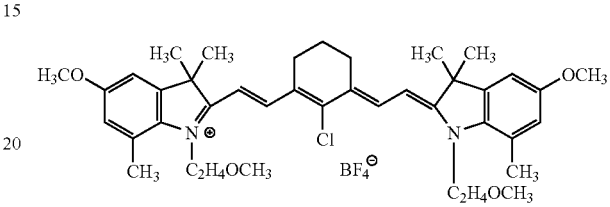

Dye

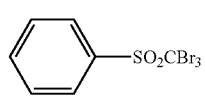

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % Na$_2$CO$_3$ aqueous solution, washed and dried, then, the resulting resist pattern was evaluated. As a result, a resist resolution of a width of 5 μm between adjacent beam spot irradiated sites was confirmed.

Example B-12

100 parts by weight of a vinyl-based polymer (Q-1), 20 parts by weight of a dye described below, 10 parts by weight of a thermal acid generator described below and 0.5 parts by weight of p-toluenesulfonic acid were added into methyl ethyl ketone so that the solid content thereof was 20 wt %, to obtain a liquid composition.

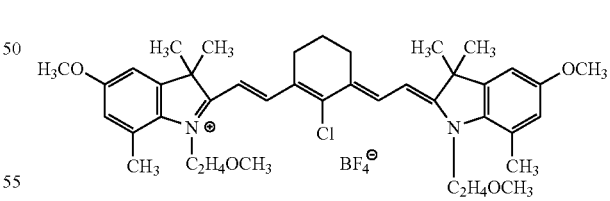

Dye

Thermal acid generator

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 μm between adjacent beam spot irradiated sites was confirmed.

Example B-13

100 parts by weight of a vinyl-based polymer (Q-1), 20 parts by weight of a dye described below, 10 parts by weight of a thermal acid generator described below, 0.5 parts by weight of p-toluenesulfonic acid and 1.5 parts by weight of a UV absorber were added into methyl ethyl ketone so that the solid content thereof was 20 wt %, to obtain a liquid composition.

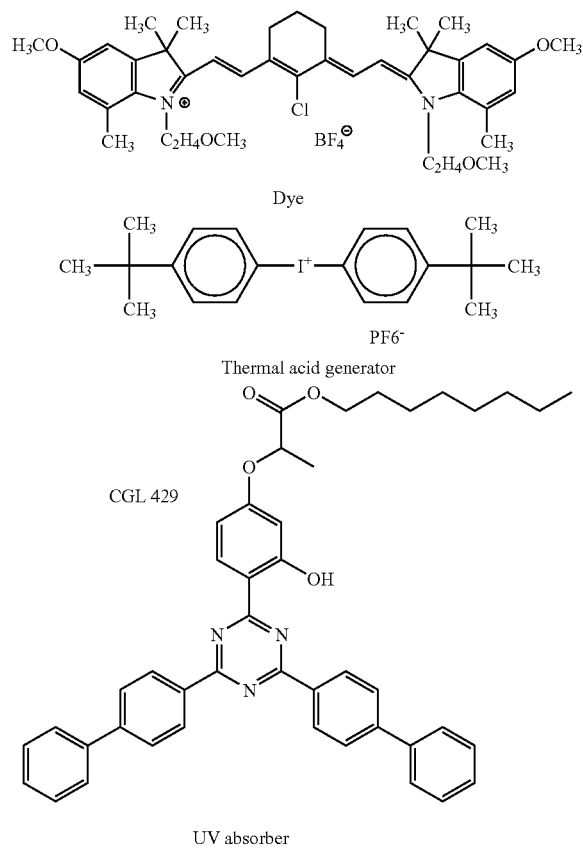

This liquid composition was coated on a copper base plate so that the film thickness after drying was 1.5 μm, and dried at room temperature to form a photosensitive layer. This photosensitive layer was irradiated with laser under the conditions described above. After exposure, the layer was developed (25° C., 1 minute) by a 1.5 wt % $Na_2CO_3$ aqueous solution, washed and dried, then, the resulting resist pattern was evaluated. As a result, a resist resolution of a width of 5 μm between adjacent beam spot irradiated sites was confirmed.

The invention claimed is:

1. A near infrared ray activation-type positive resist composition comprising:
   (A) a vinyl-based polymer having a structural unit represented by the following general formula (1b), which has a carboxyl group blocked by an ether having an alkenyl group next to an ether oxygen:

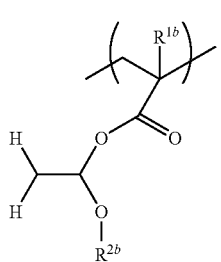

(1b)

wherein $R^{1b}$ represents a hydrogen atom or a lower alkyl group, $R^{2b}$ represents a substituted or unsubstituted alkyl group;

(B) at least one dye represented by the following formula ($D^1$) or ($D^2$)

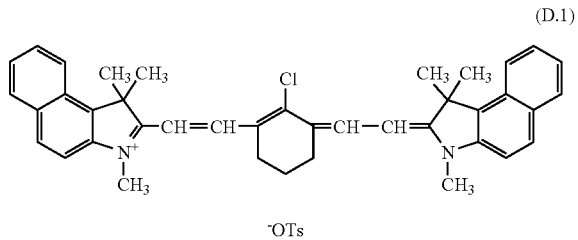

which generates heat by a light in the near infrared region, and (C) at least one thermal acid generator represented by the following formula (G1), (G2), or (G3)

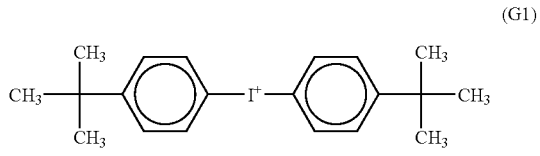

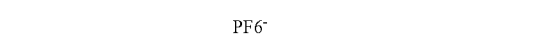

which generates an acid by heat.

2. The near infrared ray activation type positive resist composition according to claim 1, wherein the vinyl-based polymer having a structural unit of the general formula (1b) has a weight-average molecular weight of 2000 to 300000.

3. The near infrared ray activation type positive resist composition according to claim 1, wherein said vinyl-based polymer is that which is obtained using at least a monomer in which a carboxyl group is blocked using said ether having an alkenyl group next to an ether oxygen.

4. The near infrared ray activation type positive resist composition according to claim 1, further comprising an acid.

5. A method for forming a pattern on a base plate, comprising the steps of forming a layer of the near infrared ray activation type positive resist composition according to claim 1 in a pattern on said base plate, irradiating a given part of the layer with near infrared ray, and removing the irradiated part from on said base plate by alkali development to form a pattern of said near infrared ray activation type positive resist composition on said base plate.

6. The method for forming a pattern according to claim 5, wherein said near infrared ray contains a light of 830 nm.

7. The near infrared ray activation type positive resist composition according to claim 1, wherein the vinyl-based polymer having a structural unit of the general formula (1) has a weight-average molecular weight of 2000 to 300,000.

* * * * *